(12) United States Patent
Nathan et al.

(10) Patent No.: US 10,061,434 B2
(45) Date of Patent: Aug. 28, 2018

(54) PROCESSING SIGNALS FROM A TOUCHSCREEN PANEL

(71) Applicant: Cambridge Touch Technologies Ltd., Cambridge (GB)

(72) Inventors: Arokia Nathan, Cambridge (GB); Jackson Chi-Sun Lai, Markham (CA); Shuo Gao, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 15/346,696

(22) Filed: Nov. 8, 2016

(65) Prior Publication Data

US 2017/0139527 A1 May 18, 2017

(51) Int. Cl.
| | | |
|---|---|---|
| *G06F 3/041* | (2006.01) | |
| *G06F 3/044* | (2006.01) | |
| *G06K 9/40* | (2006.01) | |
| *G06T 5/00* | (2006.01) | |
| *H04N 5/357* | (2011.01) | |

(52) U.S. Cl.
CPC ............ *G06F 3/0416* (2013.01); *G06F 3/044* (2013.01); *G06F 3/0418* (2013.01); *G06K 9/40* (2013.01); *G06T 5/002* (2013.01); *H04N 5/3575* (2013.01); *G06F 2203/04104* (2013.01)

(58) Field of Classification Search
CPC ...... G06F 3/0416; G06F 3/0418; G06F 3/044; G06F 2203/04104; H04N 5/3575; G06K 9/40; G06T 5/002
See application file for complete search history.

(56) References Cited

U.S. PATENT DOCUMENTS

| | | |
|---|---|---|
| 4,516,112 A | 5/1985 | Chen |
| 4,899,710 A | 2/1990 | Takahashi et al. |
| 5,942,733 A | 8/1999 | Allen |

(Continued)

FOREIGN PATENT DOCUMENTS

| | | |
|---|---|---|
| EP | 2693316 A1 | 2/2014 |
| EP | 2871554 A1 | 5/2015 |

(Continued)

OTHER PUBLICATIONS

International Search Report and Written Opinion of International Searching Authority in counterpart PCT Application PCT/GB2016/053857, dated Feb. 17, 2017.

(Continued)

*Primary Examiner* — Liliana Cerullo

(57) ABSTRACT

A method is described including receiving (S3) a first array of values obtained from measuring an array of touch panel sensor areas (FIG. 4; $I_{n,m}$). The method also includes generating (S4) a second array of values based on subtracting a reference array of values from the first array of values. The method also includes determining (S5) presence of at least one touch event in dependence upon the second array of value and, upon a negative determination (S8) generating a new reference array based on exponential smoothing of the reference array and the first array using a weighting factor, wherein the weighting factor is zero, and storing the new reference matrix and, upon a positive determination (S6) outputting the second array (FIG. 9).

17 Claims, 21 Drawing Sheets

(56) References Cited

U.S. PATENT DOCUMENTS

| | | | |
|---|---|---|---|
| 6,474,164 B1* | 11/2002 | Mucciardi | G01N 29/36 73/602 |
| 7,042,288 B2 | 5/2006 | Matsui et al. | |
| 8,982,081 B2 | 3/2015 | Li et al. | |
| 8,988,384 B2 | 3/2015 | Krah et al. | |
| 2003/0223622 A1* | 12/2003 | Simon | G06K 9/00281 382/118 |
| 2004/0155991 A1 | 8/2004 | Lowles et al. | |
| 2005/0024344 A1 | 2/2005 | Trachte | |
| 2006/0118729 A1* | 6/2006 | Chin | G01J 1/46 250/370.08 |
| 2006/0138983 A1 | 6/2006 | Lee | |
| 2007/0040814 A1 | 2/2007 | Lee | |
| 2007/0119698 A1 | 5/2007 | Day | |
| 2007/0163815 A1 | 7/2007 | Ungaretti | |
| 2007/0262964 A1 | 11/2007 | Zotov | |
| 2008/0048995 A1 | 2/2008 | Abileah | |
| 2009/0027353 A1 | 1/2009 | Im et al. | |
| 2009/0061823 A1 | 3/2009 | Se | |
| 2009/0065267 A1 | 3/2009 | Sato | |
| 2009/0066663 A1 | 3/2009 | Chang | |
| 2009/0254869 A1 | 10/2009 | Ludwig et al. | |
| 2009/0309616 A1 | 12/2009 | Klinghult et al. | |
| 2010/0013800 A1 | 1/2010 | Elias | |
| 2010/0051354 A1 | 3/2010 | Ningrat et al. | |
| 2010/0066692 A1 | 3/2010 | Noguchi | |
| 2010/0079384 A1 | 4/2010 | Grivna | |
| 2010/0109595 A1 | 5/2010 | Tan et al. | |
| 2010/0110026 A1 | 5/2010 | Kis | |
| 2010/0128002 A1 | 5/2010 | Stacy et al. | |
| 2010/0144391 A1 | 6/2010 | Chang | |
| 2010/0253638 A1 | 10/2010 | Yousefpor | |
| 2010/0309164 A1 | 12/2010 | Yeh et al. | |
| 2011/0001492 A1 | 1/2011 | Nys | |
| 2011/0050618 A1 | 3/2011 | Murphy et al. | |
| 2011/0096025 A1 | 4/2011 | Slobodin | |
| 2011/0175844 A1 | 7/2011 | Berggren | |
| 2011/0261007 A1 | 10/2011 | Joharapurkar | |
| 2011/0291994 A1 | 12/2011 | Kwak | |
| 2012/0013572 A1 | 1/2012 | Pak et al. | |
| 2012/0057803 A1 | 3/2012 | Wakazono | |
| 2012/0062508 A1 | 3/2012 | Liu et al. | |
| 2012/0105367 A1 | 5/2012 | Son | |
| 2012/0121142 A1 | 5/2012 | Nageesh | |
| 2012/0242610 A1 | 9/2012 | Yatsumatsu | |
| 2012/0268416 A1 | 10/2012 | Pirogov et al. | |
| 2012/0293551 A1 | 11/2012 | Momeyer | |
| 2012/0299868 A1 | 11/2012 | Bhagavat | |
| 2013/0009905 A1 | 1/2013 | Castillo | |
| 2013/0021285 A1 | 1/2013 | Kimura | |
| 2013/0050126 A1 | 2/2013 | Kimura et al. | |
| 2013/0050130 A1 | 2/2013 | Brown | |
| 2013/0076646 A1 | 3/2013 | Krah | |
| 2013/0076647 A1 | 3/2013 | Yousefpor | |
| 2013/0082970 A1 | 4/2013 | Frey | |
| 2013/0176275 A1 | 7/2013 | Weaver et al. | |
| 2013/0194198 A1 | 8/2013 | Guard | |
| 2013/0229382 A1 | 9/2013 | Huang | |
| 2013/0234986 A1 | 9/2013 | Elias | |
| 2013/0234987 A1 | 9/2013 | Ye | |
| 2013/0257744 A1 | 10/2013 | Daghigh et al. | |
| 2013/0257759 A1 | 10/2013 | Daghigh | |
| 2013/0257769 A1 | 10/2013 | Sheik-Nainar | |
| 2013/0257799 A1 | 10/2013 | Lamont et al. | |
| 2013/0265239 A1 | 10/2013 | Parekh | |
| 2013/0265256 A1 | 10/2013 | Nathan | |
| 2013/0307823 A1 | 11/2013 | Grivna | |
| 2014/0043287 A1 | 2/2014 | Nakijima | |
| 2014/0043289 A1 | 2/2014 | Stern | |
| 2014/0008203 A1 | 6/2014 | Nathan | |
| 2014/0028606 A1 | 6/2014 | Giannetta | |
| 2014/0210781 A1 | 7/2014 | Stern | |
| 2014/0285456 A1 | 9/2014 | Zhang | |
| 2014/0368260 A1 | 12/2014 | Tanada | |
| 2015/0070278 A1* | 3/2015 | Rehn | G06F 3/03543 345/163 |
| 2015/0234446 A1 | 8/2015 | Nathan et al. | |
| 2015/0234519 A1 | 8/2015 | Gowreesunker et al. | |
| 2015/0242050 A1 | 8/2015 | Huang et al. | |
| 2015/0242054 A1* | 8/2015 | Gao | G06F 3/0418 345/174 |
| 2015/0253935 A1 | 9/2015 | Toda | |
| 2015/0261344 A1 | 9/2015 | Wigdor | |
| 2015/0302554 A1 | 10/2015 | Costa et al. | |

FOREIGN PATENT DOCUMENTS

| | | |
|---|---|---|
| EP | 2884373 A1 | 6/2015 |
| EP | 2899615 A1 | 7/2015 |
| WO | 2007146785 A1 | 12/2007 |
| WO | 2009150498 A1 | 12/2009 |
| WO | 2011055809 A1 | 5/2011 |
| WO | 2012031564 A1 | 3/2012 |
| WO | 2012034715 A1 | 3/2012 |
| WO | 2014/098946 A1 | 6/2014 |
| WO | 2014092758 A1 | 6/2014 |
| WO | 2014094283 A1 | 6/2014 |
| WO | WO 2014098946 A1 | 6/2014 |
| WO | 2014/129083 A1 | 8/2014 |
| WO | 2014129083 A1 | 8/2014 |
| WO | 2014/192786 A1 | 12/2014 |
| WO | 2014192786 A1 | 12/2014 |
| WO | 2015046289 A1 | 4/2015 |
| WO | 2015/077200 A1 | 5/2015 |
| WO | 2015/098725 A1 | 7/2015 |
| WO | 2015098725 A1 | 7/2015 |

OTHER PUBLICATIONS

Search Report From the UK Patent Office, dated May 12, 2016, for UK Priority Application No. GB 1519948.2.

United Kingdom Examination Report, dated Jul. 16, 2016, for UK Priority Application No. GB 1519948.2.

Letter from UK Patent Office, dated Jul. 26, 2016 indicating no further objections to UK Priority Application No. GB 1519948.2.

International Search Report of International Searching Authority in counterpart PCT Application PCT/GB2016/053489, dated Jan. 20, 2017, 3 pages.

Written Opinion for counterpart PCT Application PCT/GB2016/053489, dated Feb. 17, 2017, 9 pages.

Chenchi Luo et. al. "Compressive Sensing for Sparse Touch etection on Capacitive Touch Screens", IEEE Journal on Emerging and Selected Topics in Circuits and Systems, IEEE, Sep. 1, 2012, pp. 639-648, vol. 2, No. 2, Piscataway, NJ, USA.

* cited by examiner

| Range | SNR | Example |
|---|---|---|
| $0 < \alpha < 1$ | SNR Degrades | $f_S = 2f_H$ |
| $\alpha = 1$ | SNR Maintained | $2f_H > f_S > f_H$ |
| $1 < \alpha < +\infty$ | SNR Boosted | $f_S \gg f_H$ |

Figure 21

| Parameter | Unit | Value |
|---|---|---|
| Diagonal | Inch | 10.1 |
| Aspect Ratio | None | 16/9 |
| Excitation Voltage | Volt | 10 |
| Display Pixel Size | (Micrometer)$^2$ | 56×56 |
| TX Electrode Size | Millimeter | 3 |
| RX Electrode Size | Micrometer | 449 |
| Refreshing rate | Hertz | 60 |
| Sensing Array Size | (Millimeter)$^2$ | 3×3 |
| Sensing Array Spacing | Millimeter | 2 |

Figure 22

PROCESSING SIGNALS FROM A TOUCHSCREEN PANEL

FIELD OF THE INVENTION

The present invention relates to processing signals from a touchscreen panel.

BACKGROUND

Touchscreen panels (TSPs) are widely used in consumer electronic devices. Resistive and capacitive touchscreen panels have widely adopted as input means for data processing devices, in particular for mobile devices such as smartphones, tablet computers and laptops. There is also growing interest in pressure sensing touchscreen panels, for example as described in US 2014/0008203 A1.

Regardless of the mechanism used by a touchscreen panel to detect user inputs, mis-registration of user input is undesirable. For example, mis-registration of the presence or location of a user's interaction using a digit or stylus. There is also a need to keep the power consumption of touchscreen panels low to avoid shortening the battery life of mobile devices. Two of the main factors which influence touch registration and power consumption are noise and multi-valued offsets in the output signals from a touchscreen panel.

Touchscreen panels are commonly arranged to record user interactions or touch events in a two dimensional grid or array arrangement. As used herein, the term "touch event" refers to a user interacting with a touchscreen by touching or pressing the touchscreen panel using a digit/finger or a suitable stylus. Herein, the signals output from a touchscreen panel having a two dimensional grid or array arrangement are collated into a corresponding array or frame. Such a frame may be presented as an image to help visualise the output signals from a touchscreen panel as a whole.

FIG. 1 illustrates noise sources in a touchscreen panel. In grayscale plots illustrating frames $F_{single}$, $F_0$, regions labelled "DB" correspond to low signal levels, regions labelled "LB" correspond to intermediate signal levels and regions labelled "R" correspond to high signal level.

Referring to FIG. 1, noise signals in a touchscreen panel may come from many sources including, for example, stochastic, or random noise components 1, deterministic, or common-mode noise components 2 and offsets 3. Stochastic noise components 1 represents random noise, for example, thermal noise from the touchscreen circuitry. Deterministic noise components 2 represents systematic sources, for example, mains electricity pick-up at 50-60 Hz, noise generated by a display, common-mode noise including power supply spikes induced by a charger for a mobile device. Deterministic noise components 2 encompasses regular but unintended signals in the touchscreen panel. Deterministic noise components 2 may be induced by other components of a device including a touchscreen panel, or may result from the ambient environment. The sum of the stochastic noise components 1 and deterministic noise components 2 produces the noise signal 4. In practice, it is often difficult or impossible to strictly divide the noise 4 into stochastic 1 and deterministic 2 components, and different frequency bandwidths may include greater or lesser contributions from stochastic 1 and deterministic 2 components. Offsets 3 may be non-uniform across the grid or array of the touchscreen panel. Offsets 3 may arise because the readout from an individual electrode, an intersection of electrodes, a sensor etc, may in general have a slightly different DC offset. Offsets 3 need not be DC, and in some touchscreen panels the offsets 3 may slowly vary or drift over time. Offsets 3 may result from the hardware of a device incorporating the touchscreen panel, or may result from factors in the ambient environment such as, for example, ambient temperature. The noise 4 combines with the offsets 3 to produce a background noise frame $F_0$. When the touchscreen panel is touched, the resulting signal frame $F_{single}$ is a superposition of the desired touch signals and the background noise frame $F_0$.

FIGS. 2A, 2B and 2C illustrate touchscreen signal frames $F_{single}$, $F_{multi}$, $F_0$. In greyscale plots illustrating touchscreen panel frames $F_{single}$, $F_{multi}$, $F_0$, regions labelled "DB" correspond to low signal levels, regions labelled "LB" correspond to intermediate signal levels and regions labelled "R" correspond to high signal level.

Referring also to FIGS. 2A, 2B and 2C, the touchscreen signal frames may be single touch signal frames $F_{single}$, multi-touch signal frames $F_{multi}$ or no-touch signal frames, such as background noise frame $F_0$. The term "single-touch" refers to a user interaction in which a single digit of a user, or a single suitable stylus touches or presses the touchscreen panel. The term "multi-touch" refers to a user interaction in which two or more digits of a user, or two of more suitable styluses, or a combination of a user's digits and a stylus, touch or press the touchscreen panel concurrently.

In an ideal touchscreen panel, the signal frames $F_0$, $F_{single}$, $F_{multi}$ would register zero everywhere except at the locations of user interactions. However, in general, almost all of the locations of a two dimensional grid or array arrangement of a touchscreen will have non-zero values, so that signals resulting from touch events must be large enough to overcome the noise 4 and offsets 3.

Consequently, the signal-to-noise ratio (SNR) of the touchscreen panel may be compromised, resulting in failures to register touch events and/or false registration of touch events which have not actually occurred. In order to achieve a high SNR, the excitation power may be increased for an active touchscreen panel or the amplification gain may be increased for a passive touchscreen panel. However, increasing the excitation power or amplification gain may increase the power consumption of a touchscreen panel and shorten battery life of a device incorporating the touchscreen panel. In touchscreen panels which provide analog outputs, for example in pressure sensing touchscreen panels, the SNR may limit the resolution of analog output signals, for example, force-touch signals.

The offset 3 of a single electrode, electrode intersection, sensor etc in a touchscreen panel may be cancelled by subtracting a fixed value or by applying a detection threshold which must be exceeded for a touch event to be registered. However, non-uniformity of the offsets 3 across the touchscreen panel may make application of a single threshold or offset correction difficult, and may require a high threshold to avoid touch registration errors.

FIG. 3 illustrates touch signals obtained from a number of electrodes of a touchscreen panel.

Referring to FIG. 3, $1^{st}$ to $N^{th}$ electrode of a touchscreen panel have respective offset values $\Delta_1, \Delta_2, \ldots, \Delta_N$. A detection threshold for registering a touch event should be set at a level which at least exceeds the largest offset value $\Delta_1, \Delta_2, \ldots, \Delta_N$. For example, in a case when the output signals of a touchscreen panel are voltage signals corresponding to each electrode, a voltage threshold $V_{TH}$ should be set which at least exceeds the largest voltage offset value $\Delta V_1, \Delta V_2, \ldots, \Delta V_N$. Setting a detection threshold $V_{TH}$ according to the largest offset value $\Delta V_1, \Delta V_2, \ldots, \Delta V_N$ may increase power consumption and may also reduce the dynamic range available for using analog output signals from, for example pressure sensing touchscreen panels.

SUMMARY OF THE INVENTION

The present invention seeks to provide improved processing output signals from a touch panel.

According to a first aspect of the invention there is provided a method including receiving a first array of values obtained from measuring an array of touch panel sensor areas. The method also includes generating a second array of values based on subtracting a reference array of values from the first array of values. The method also includes determining presence of at least one touch event in dependence upon the second array of value and, upon a negative determination generating a new reference array based on exponential smoothing of the reference array and the first array using a weighting factor, wherein the weighting factor is zero, and storing the new reference matrix and, upon a positive determination outputting the second array.

Thus, the values measured from an array of touch panel sensors may be corrected to remove or reduce noise signals and offsets of the sensor areas. Thus, a reference array used for the correction may be dynamically updated, allowing the correction to adapt to changes in the noise environment and/or drift in the sensor area offsets.

A touch event may include a user interacting with the touchscreen panel by touching or pressing the touchscreen panel using a digit/finger or a suitable stylus. A touch event may include a user interacting with the touchscreen panel by placing a digit/finger or a suitable stylus in proximity to the touchscreen panel. A touch event may include a user touching the sensor areas directly or touching an outer surface of one or more layer separating the user from the sensor areas.

Each value of the first array may be obtained from a direct measurement of a voltage, current or charge signal from the respective sensor area. Each value of the first array may be obtained based on one or more parameters of a voltage, current or charge signal directly measured from the respective sensor area. Each value of the first array may be obtained based on two or more voltage, current or charge signals directly measured from the respective sensor area and one or more other sensor areas.

The touchscreen panel may include a plurality of first electrodes extending in a first direction and a plurality of second electrodes extending in a second direction different to the first direction. The first and second electrodes may form a grid and each intersection of the grid may define a respective sensor areas. Each sensor area of the sensor array may correspond to a respective discrete sensor.

Generating the second array may include generating a third array by subtracting the reference array from the first array, generating the second array by filtering the third array using a spatial low pass filter having a bandwidth equal to a reference bandwidth value.

Thus, noise signals which are uncorrelated with the reference array may be reduced by the smoothing effect of spatial low pass filtering.

The method may further include determining, based on a difference of the second array and the third array, a first amount by which values corresponding to at least one touch event are attenuated and a second amount by which values not corresponding to any touch event are attenuated, generating a new reference bandwidth value based on the first amount and the second amount, and storing the new reference bandwidth value.

Thus, the bandwidth for spatial low pass filtering of the third array may be dynamically altered to optimise the relative attenuation of noise signals and touch signals. This may allow improved reduction of noise signals when changes occur in one or more of the ambient environment, the user of a touch panel sensor array and an input method of a user, for example from using a digit to using a stylus.

Determining the new reference bandwidth value may include comparing the first amount to a predetermined threshold, and in dependence upon the first amount exceeding the threshold, generating the new reference bandwidth value by subtracting a bandwidth increment from the reference bandwidth value.

In dependence upon the first amount not exceeding the threshold, the new reference bandwidth may be generated by adding the bandwidth increment to the reference bandwidth value. The bandwidth increment may be predetermined. The bandwidth increment may be dynamically determined based on the third matrix.

Determining the new reference bandwidth value may include determining, based on a first model relating the first amount to the bandwidth value and a second model relating the second amount to the bandwidth value, an optimal bandwidth value such that the second amount is maximised without the first amount exceeding a predetermined threshold, and generating the new reference bandwidth based on the optimal bandwidth.

The spatial low pass filter may be a linear filter. The spatial low pass filter may be a Gaussian filter and the reference bandwidth value for the spatial low pass filter may be a standard deviation of the Gaussian filter.

Generating the second array by filtering the third array using a spatial low pass filter may include generating a fourth array, each entry of the fourth array calculated by summing at least three adjacent row entries of the third array including the corresponding entry of the third array, and generating the third array, each entry of the third array calculated by summing at least three adjacent column entries of the fourth array including the corresponding entry of the fourth array, and dividing by a respective scaling factor.

The spatial low pass filter may be a non-linear filter.

Each first array value may be based on the capacitance of the respective sensor area. Each first array value may be based on the force applied to the respective sensor area. Each entry of the first array may be a sub-array having a first value based on the capacitance of the respective sensor area and a second value based on the force applied to the respective sensor area, wherein operations performed on the first array are performed entry-wise on each sub-array.

The method may enhance the signal-to-noise ratio for components of the output signals corresponding to touch events by 1 to 5 dB, 5 to 10 dB, 10 to 15 dB or more than 15 dB. The method may attenuate components of the output signals corresponding to noise signals by more 1 to 5 dB, 5 to 10 dB, 10 to 15 dB, 15 to 20 dB or more than 20 dB.

According to a second aspect of the invention there is provided a computer program stored on a computer readable medium which, when executed by a data processing unit, causes the data processing unit to execute the method of processing output signals from a touchscreen panel.

According to a third aspect of the invention there is provided computer program product stored on a non-transitory computer readable medium which, when executed by a data processing unit, causes the data processing unit to execute the method of processing output signals from a touchscreen panel.

According to a fourth aspect of the invention there is provided apparatus including a frame reading module configured to receive a first array of values obtained from measuring an array of touch panel sensor areas. The apparatus also includes a correlated double sampler configured to generate a second array of values based on subtracting a reference array of values from the first array of values. The apparatus also includes a touch decision module configured to determine presence of at least one touch event in dependence upon the second array of values and, upon a negative determination generate a new reference array based on exponential smoothing of the reference array and the first array using a weighting factor and store the new reference matrix and, upon a positive determination output the second array.

According to a fifth aspect of the invention there is provided a touch panel system including a touch panel including a plurality of sensor areas disposed in a sensor array, each sensor area configured to provide an output signal which varies in response to a touch event, and the apparatus.

Each given sensor area of the touch panel may be configured to provide an output signal based on the capacitance of the given sensor area. Each given sensor area of the touch panel may be configured to provide an output signal based on a force applied to the given sensor area. Each sensor area of the touch panel may be configured to provide a single output single which is based on the capacitance of the given sensor area and the force applied to the given sensor area.

BRIEF DESCRIPTION OF THE DRAWING

Certain embodiments of the present invention will now be described, by way of example, with reference to the accompanying drawings in which:

FIG. 6A schematically illustrates a projected capacitance touchscreen panel viewed side-on;
FIG. 13 schematically illustrate an example stack-up for a back-lit liquid crystal display incorporating a touchscreen panel viewed side-on;
FIGS. 16A and 16B schematically illustrate grids of signal values;
FIG. 21 is a table illustrating different cases for applying correlated double sampling to a harmonic, single frequency, signal;
and
FIG. 22 is a giving details of an experimental projected capacitance touchscreen panel used for testing first and second methods of processing output signals from a touchscreen panel;

DETAILED DESCRIPTION

Figure 1:
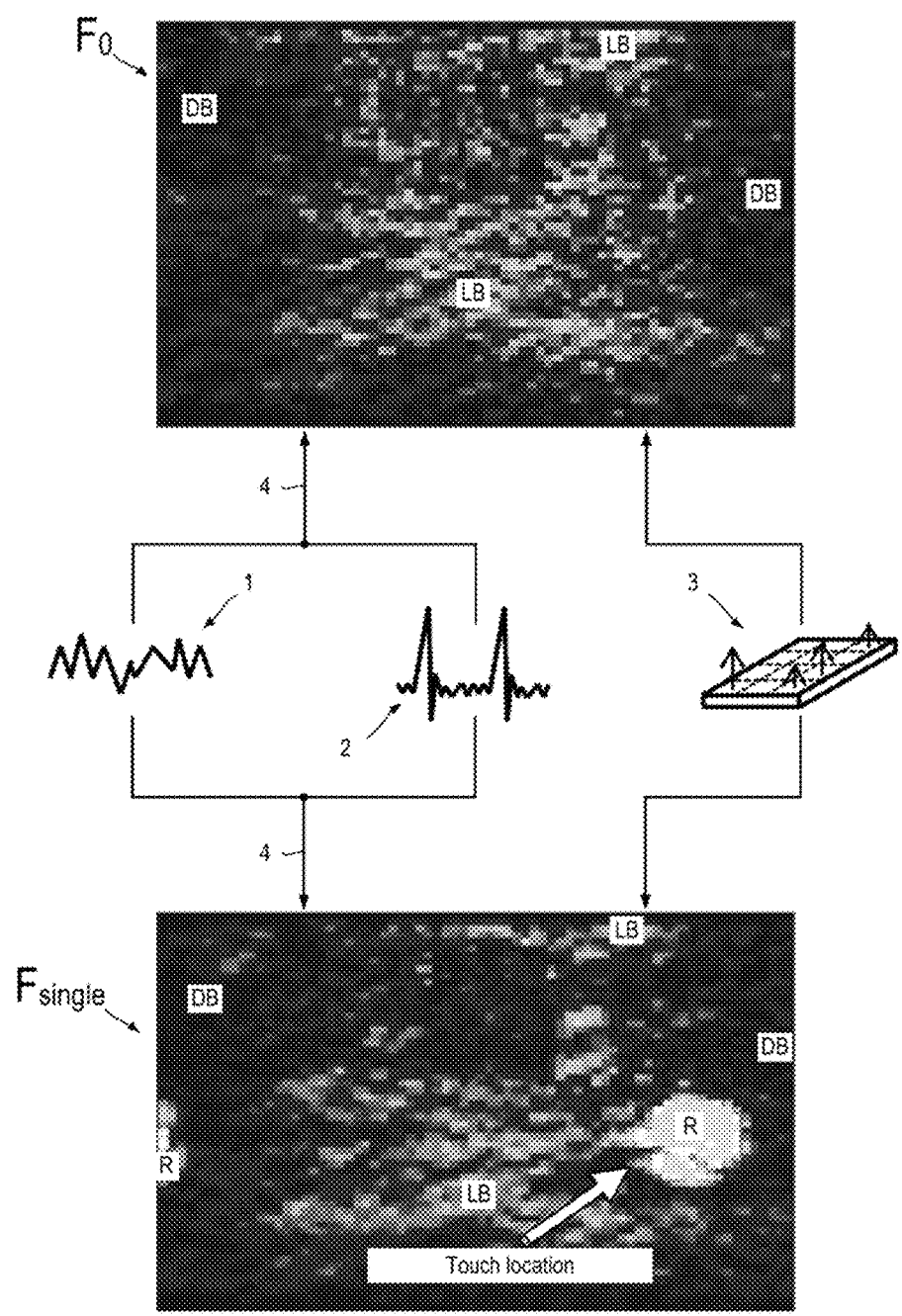
FIG. 1 illustrates noise sources in a touchscreen panel.
Figure 2A:
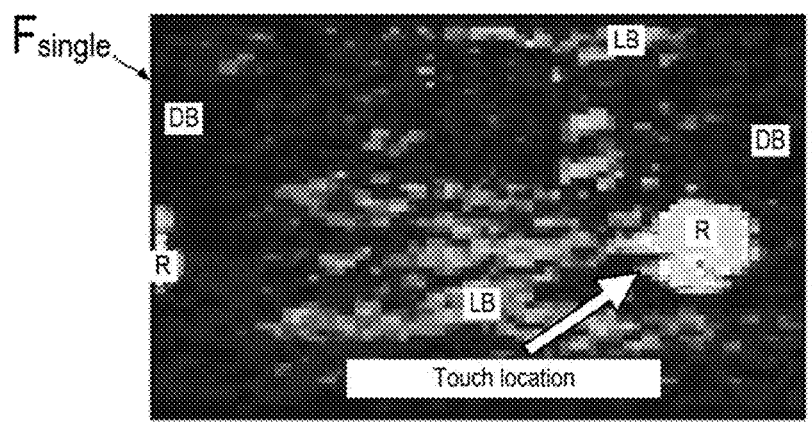
FIG. 2A illustrates signal frame from a single-touch event.
Figure 2B:
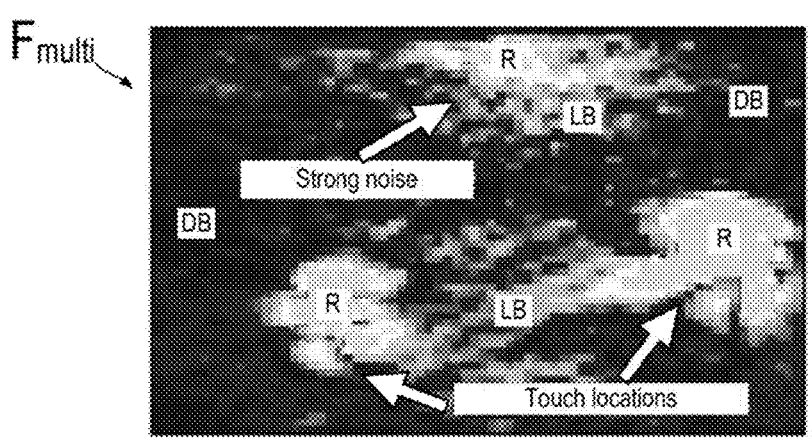
FIG. 2B illustrates signal frame from a multi-touch event.
Figure 2C:
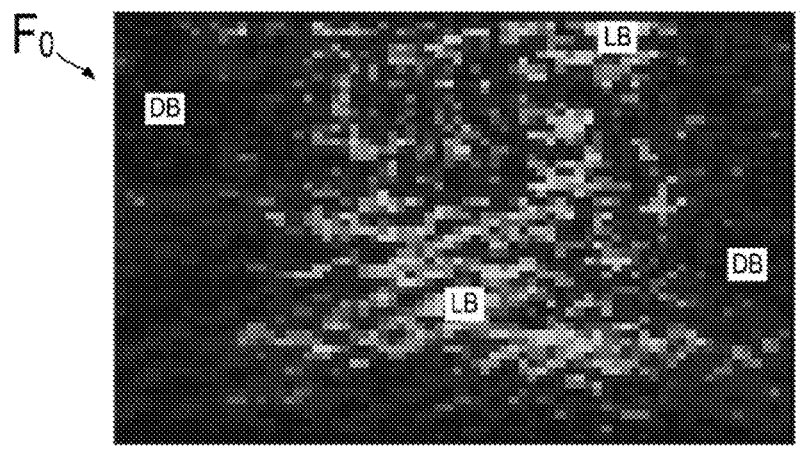
FIG. 2C illustrates signal frame in the absence of any touch event.
Figure 3:
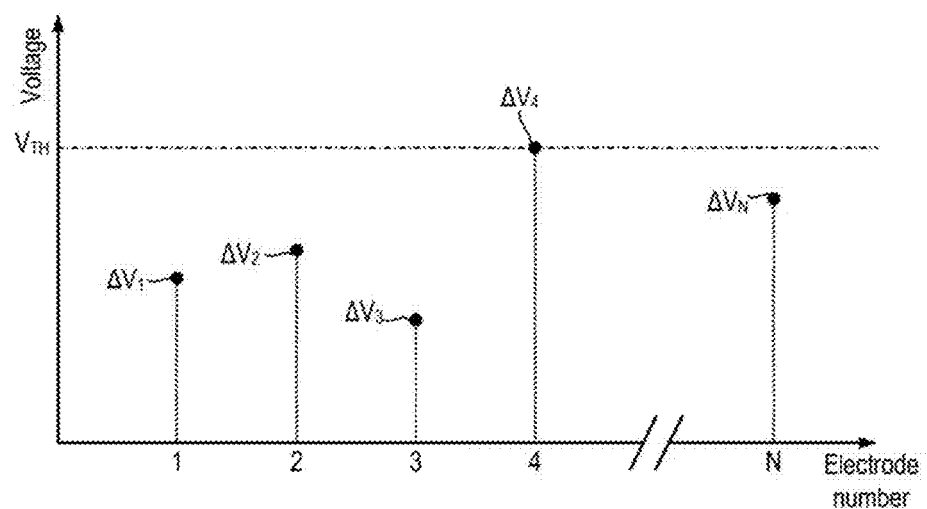
FIG. 3 illustrates touch signals obtained from a number of electrodes of a touchscreen panel.

In the following description, like parts are denoted by like reference numerals.

Figure 4:
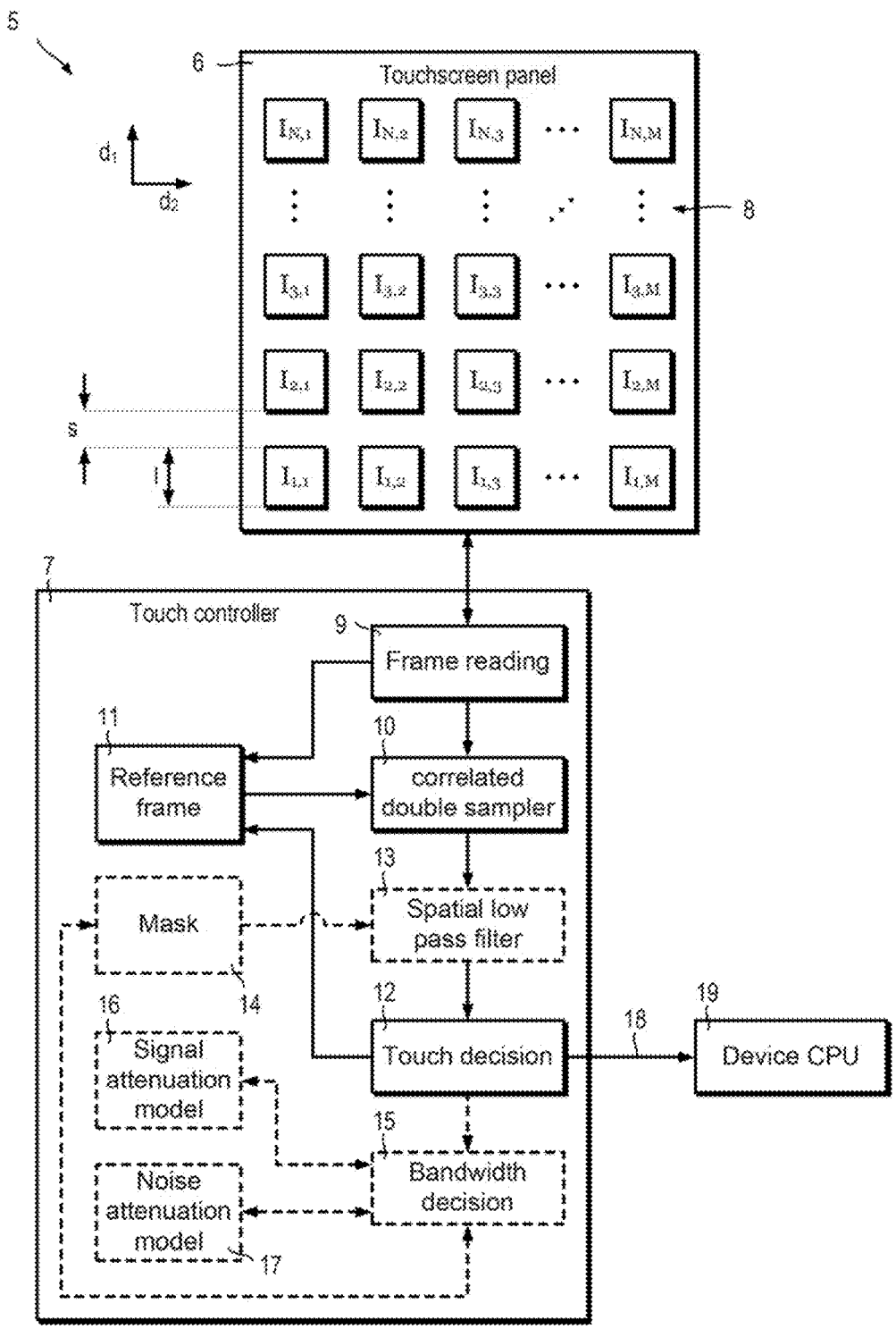
FIG. 4 schematically illustrates a touchscreen system including a touchscreen panel and a touch controller.

FIG. 4 schematically illustrates a touchscreen system 5 including a touchscreen panel 6 and a touch controller 7.

Referring to FIG. 4, a touchscreen panel includes a two dimensional N by M grid 8 of sensor areas $I_{n,m}$, $I_{n,m}$ denotes the $n^{th}$ of N sensor areas spaced apart in a first direction $d_1$ and the $m^{th}$ of M sensor areas spaced apart in a second direction $d_2$. The first and second directions $d_1$, $d_2$ may be, for example, perpendicular x and y directions. Sensor areas $I_{n,m}$ have a characteristic dimension l and are spaced apart in the first and second directions $d_1$, $d_2$ by an amount s. The sensor areas $I_{n,m}$ have an active area $A_s$, and may or may not have the same shape in the first and second directions $d_1$, $d_2$. The sensor areas $I_{n,m}$ may or may not be spaced apart by the same amount s in the first and second directions, for example $l_1 \neq l_2$. Each sensor area $I_{n,m}$ is typically defined by the overlap or intersection of an electrode $X_n$ extending in the first direction $d_1$ and an electrode $Y_m$ extending in the second direction $d_2$, the first electrodes $X_1, \ldots, X_n, \ldots, X_N$ and second electrodes $Y_1, \ldots, Y_m, \ldots, Y_M$ defining the grid 8. However, each sensor area $I_{n,m}$ may alternatively be a discrete sensor. The sensor areas $I_{n,m}$ may produce signals indicating one or more of a capacitance, a resistance and a pressure, depending on the type of touchscreen panel 6.

The touch controller 7 includes a frame reading module 9, a correlated double sampler 10, a reference frame store x and a touch decision module 12. The touch controller 7 optionally includes a spatial low pass filter 13, a filter mask store 14, a bandwidth decision module 15, a signal attenuation model store 16 and a noise attenuation model store 17. The frame reading module 9, the correlated double sampler 10, the touch decision module 12 and optionally the spatial low pass filter 13 and the bandwidth decision module 15 may be provided by one or more hardware modules, or they may be provided as modules executed by one or more data processors. The reference frame store 11 and optionally the filter mask store 14, signal attenuation model store 16 and noise attenuation model store 17 may be provided by, for example, volatile or non-volatile memory (not shown) or a storage device (not shown). When the reference frame store 11 and optionally the filter mask store 14, signal attenuation model store 16 and noise attenuation model store 17 are provided by a volatile memory, they may be stored in a non-volatile memory or storage device when the touchscreen system 5 is not powered.

The frame reading module 9 reads output signals from the sensor areas $I_{n,m}$ and collates them as a signal frame matrix or array. The output signal from the sensor area $I_{n,m}$ is denoted $F(n,m)$ in which the integer indices n, m denote the row and column of an entry in the frame array which stores the output signal from the sensor area $I_{n,m}$. In this way, the output signal from a sensor area $I_{n,m}$ is stored a relative location in the frame $F(n,m)$ which corresponds to the relative location of the respective sensor area $I_{n,m}$ in the grid 8. The frame reading module 9 reads out frames $F(n,m)$ at a scan frequency $f_s$. The signals values of the first frame read out are denoted $F(n,m,1)$ and the signal values of the kth frame read out are denoted $F(n,m,k)$. When the touchscreen system 5 is initially powered up, the first frame $F(n,m,k)$ read is stored to the reference frame store 11 as a reference frame $F_0(n,m)$. A frame $F(n,m,k)$ can be treated in a similar way to an image, which allows touchscreen signals corresponding to a touch event to be visualised as an image, and also allows image processing methods to be applied to the signal frame $F(n,m,k)$.

The frame reading module 9 may scan through the sensor areas $I_{n,m}$, for example a raster scan. Alternatively the frame reading module 9 may read out each sensor area $I_{n,m}$ simultaneously, for example, when sensor areas $I_{n,m}$ are discrete sensors rather than intersections of electrodes $X_n$, $Y_m$. The scan frequency $f_s$ is typically between about 20 Hz and about 200 Hz. Faster and slower scan frequencies $f_s$ are in principle possible, however, slower scan frequencies $f_s$ may result in slow response times or failures to register short touch events, and faster scan frequencies $f_s$ may be redundant given typical speeds of user interaction. The frame reading module 9 may be active or passive. When the frame reading module 9 is active, excitation signals may be addressed to the sensor area $I_{n,m}$ being read in addition to reading an output signal. For example, in a projected capacitance touchscreen panel, the frame reading module sends excitation signals to a drive electrode $D_n$ and reads output signals from a sense electrode $S_m$. When the frame reading module 9 is passive, the frame reading module only receives, and optionally amplifies, output signals from the sensor areas $I_{n,m}$. For example, the frame reading module 9 may receive and amplify charge from piezoelectric sensors in a pressure sensing touchscreen panel. The frame reading module 9 may combine active and passive reading of several quantities concurrently, for example, capacitance and pressure.

The correlated double sampler 10 receives the current signal frame $F(n,m,k)$ from the frame reading module 9 and the reference frame $F_0(n,m)$ from the reference frame store 11, and calculates a corrected frame $F_{CDS}(n,m,k)$ using correlated double sampling according to:

$$F_{CDS}(n,m,k)=F(n,m,k)-F_0(n,m)$$

in which $F_{CDS}(n,m,k)$ is a corrected signal value and $F(n,m,k)$ is a read out signal value corresponding to the sensor area $I_{n,m}$. The index k is used to distinguish between, for example, the presently read signal frame $F(n,m,k)$ and the next signal frame $F(n,m,k+1)$, and there is no upper bound for k. The corrected frame $F_{CDS}(n,m,k)$ may be represented, for each value of k, as a array or matrix in which the integer values n, m denote the row and column of an entry. The correlated double sampler 10 removes or reduces offsets 3 and common-mode components of the noise 4, which may reduce the possibility of the touch decision module 12 mis-registering a touch event.

The touch decision module 12 receives the corrected frame $F_{CDS}(n,m,k)$ and determines whether a touch event has occurred based on the signal values of the corrected frame $F_{CDS}(n,m,k)$. For example, the touch decision module 12 may apply a threshold value and register signal values $F_{CDS}(n,m,k)$ which exceed the threshold as corresponding to a single or multi-touch event. If the touch decision module 12 determines that a touch event has occurred, then touch information 18 characterising the touch event is determined and sent to a device central processing unit (CPU) 19. The touch information 18 may include information such as, for example, the number of touch events and the location of each touch event. The touch information 18 provides input to an operating system or application being executed by the device CPU 19. When the touchscreen panel is a force or pressure sensing touchscreen panel, the touch information 18 may include force or pressure values. If the touch decision module 12 does not detect any touch events in the corrected frame $F_{CDS}(n,m,k)$, then the touch decision module 12 replaces the reference frame $F_0(n,m)$ with the current corrected frame $F_{CDS}(n,m,k)$.

In this way, the stored reference frame $F_0$ is dynamically updated to reflect the most recently read frame in which no touch event occurs. This allows the touchscreen system 5 to dynamically adjust to changes in the noise 4 experienced by the touchscreen panel 6.

The optional spatial low pass filter 13 may receive the corrected frame $F_{CDS}(n,m,k)$ from the correlated double sampler 10 and provide a filtered frame $F_{CDS}(n,m,k)$ to the touch decision module 12. The filtered frame $F_{LPSF}(n,m,k)$ may be represented, for each value of k, as an array or matrix in which the integer values n, m denote the row and column of an entry. The spatial low pass filter 13 may take the form of a linear filter such as an average or Gaussian filter, and may filter the corrected frame $F_{CDS}(n,m,k)$ using a mask received from the mask store 14 in the form of an matrix or array of coefficients $C_{i,j}$ having dimensions L by W, according to:

$$F_{LPSF}(n, m, k) = \sum_{i=0}^{L-1} \sum_{j=0}^{W-1} C_{i,j} \times F_{CDS}\left( \begin{array}{c} n + i - \dfrac{L-1}{2}, \\ m + j - \dfrac{W-1}{2} \end{array} \right)$$

in which L and W are positive odd integers, i and j are indices of the filter coefficients $C_{i,j}$. For signal frame values at edges and corners, i.e. $F_{CDS}(n,m,k)$ when n=1 or n=N and m=1 or M, different mask coefficients $C_{i,j}$ may be used. The spatial low pass filter attenuates uncorrelated noise spikes not removed by the correlated double sampler 10, which may reduce the possibility of the touch decision module 12 mis-registering a touch event.

Although the spatial low pass filter 13 has been described as a linear filter, the spatial low pass filter 13 may be a non-linear filter such as, for example, a median filter.

The bandwidth decision module 15 receives the filtered frame $F_{LPSF}(n,m,k)$ and touch information 18 from the touch decision module 12, and determines whether the bandwidth of the spatial low pass filter 13 requires adjustment. The bandwidth decision module 15 uses the touch information 18 to differentiate between touch signals and residual noise after correlated double sampling. For example, signal values $F_{CDS}(n,m,k)$, $F_{LPSF}(n,m,k)$ corresponding to sensors areas $I_{n,m}$ determined to be part of a touch event by the touch decision module are signal values, and any other non-zero signal values are residual noise. The bandwidth decision module 15 determines the attenuation of the touch signal and the attenuation of the residual noise, and determines whether the bandwidth of the spatial low pass filter 13 should be updated by replacing the coefficients $C_{i,j}$ stored in the mask store 14. For example, the bandwidth decision module 15 may tune the bandwidth of the spatial low pass filter 13 to maximise the attenuation of the residual noise whilst keeping the attenuation of the touch signals below a threshold amount.

The bandwidth decision module 15 may update the bandwidth of the spatial low pass filter 13 by incremental amounts. Alternatively, the bandwidth decision module 15 may update the bandwidth of the spatial low pass filter 13 based on a signal attenuation model received from the signal attenuation model store 16 and a noise attenuation model received from the noise attenuation model store 17. A signal attenuation model describes a relationship between the attenuation of touch signals and the bandwidth of the spatial low pass filter 13. A noise attenuation model describes a relationship between the attenuation of noise signals and the bandwidth of the spatial low pass filter 13.

For details of the touch controller 7 will be described in relation to the first and second methods of processing output signals from a touchscreen panel 6.

The first and second methods of processing output signals from a touchscreen panel 6 may be used with any type of touchscreen panel 6 which outputs signals corresponding to sensor areas $I_{n,m}$ arranged in a two dimensional grid or array arrangement 8. However, before describing the first and second methods of processing output signals from a touchscreen panel 6, in may be helpful to briefly discuss one example of a suitable type of touchscreen panel 6, namely a projected capacitance touchscreen.

Capacitive Touchscreen Panels

Projected capacitance touchscreen panels measure changes of capacitance at electrodes to detect a touch event. The term projected capacitance refers to the fact that electrodes of a projected capacitance touchscreen panel need not be physically touched by a conducting object to detect a touch event. In general, electrodes of a projected capacitance touchscreen panel may be located behind a screen, for example made of glass or transparent polymer. When a conducting object such as, for example, a user's digit 22 (FIG. 6B) or a conductive stylus touches the screen, the electric field lines will be perturbed, thus modulating the charge distribution and hence the capacitance.

Projected capacitance touchscreen panels may operate according to self-capacitance of individual electrodes or mutual capacitance between pairs of electrodes. Mutual capacitance operation supports multi-touch events, and may be less sensitive to electromagnetic interference (EMI).

Figure 5A:
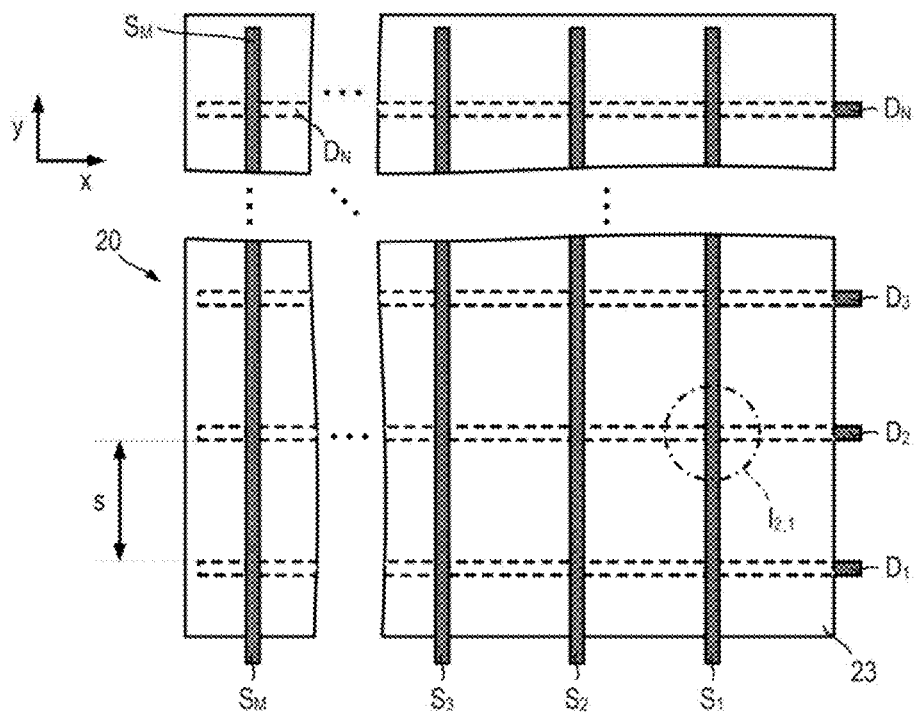
FIG. 5A schematically illustrates an electrode arrangement of a first projected capacitance touchscreen panel.
Figure 5B:
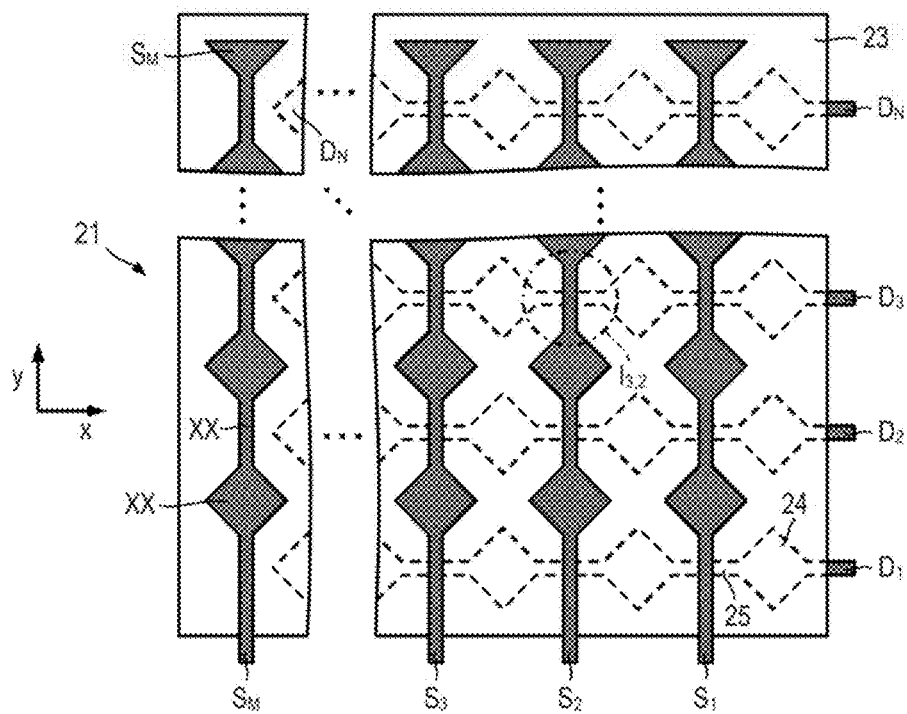
FIG. 5B schematically illustrates an electrode arrangement of a second projected capacitance touchscreen panel.
Figure 5C:
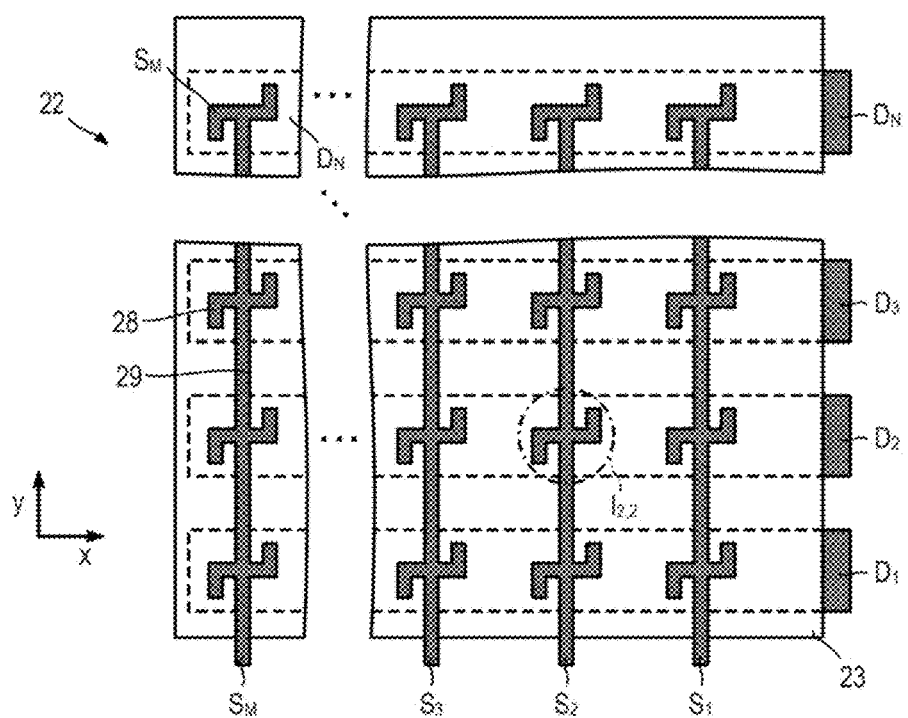
FIG. 5C schematically illustrates an electrode arrangement of a third projected capacitance touchscreen panel.

FIGS. 5A, 5B and 5C schematically illustrate exemplary arrangements of electrodes for a projected capacitance touchscreen panels 20, 21, 22 using mutual capacitance.

Referring to FIG. 5A, a first projected capacitance touchscreen panel 20 includes first electrodes $X_n$, in the form of a number of drive electrodes $D_1, D_2, \ldots, D_N$ and second electrodes $Y_m$ in the form of a number of sense electrode $S_1$, $S_2, \ldots, S_M$ disposed on a layer of dielectric material 23. The layer of dielectric material 23 extends in a plane defined by first and second perpendicular directions x, y, and has a thickness in a third direction perpendicular to the first and second directions x, y which is substantially less than any in-plane dimension of the dielectric layer 23. The sense electrodes $S_m$ are disposed on a first surface of the dielectric layer 23, for example, an upper surface, and the drive electrodes $D_a$ are disposed on a second surface of the dielectric layer 23 which is opposite to the first surface in the third direction. The drive electrodes $D_a$ take the form of rectangular strips of conductive material, elongated in the first direction x and oriented parallel to each other. The drive electrodes $D_n$ are spaced apart by an amount s in the second direction y perpendicular to the first direction x. The sense electrodes $S_m$ take the form of rectangular strips of conductive material, elongated in the second direction y and oriented parallel to each other. The sense electrodes $S_m$ are spaced apart by an amount s in the first direction x perpendicular to the second direction y.

The dielectric material layer 23 is commonly transparent when the projected capacitance touchscreen panel 20 overlies or is incorporated into a display, for example a organic light emitted diode (OLED) or liquid crystal (LC) display. For example, the dielectric material layer 23 may be glass, or may be a transparent polymer such as, for example, polyethylene terephthalate (PET) or similar plastics. The drive and sense electrodes, $D_n$, $S_m$ may also be transparent when the projected capacitance touchscreen panel 20 overlies or is incorporated into a display. For example, drive and second electrodes $D_n$, $S_m$ may be formed form indium tin-oxide (ITO) or indium zinc-oxide (IZO).

Referring also to FIG. 5B, a second projected capacitance touchscreen panel 21 is the same as the first projected capacitance touchscreen panel 20, except that the drive and sense electrodes $D_n$, $S_m$ are different shapes. In the second projected capacitance touchscreen panel 21, the drive electrodes $D_n$ take the form of a number of diamond shaped regions of conductive material 24 spaced apart in the first direction x and connected by narrow strips of conductive material 25. The sense electrodes $S_m$ may take the form of a number of diamond shaped regions of conductive material 26 spaced apart in the second direction y and connected by narrow strips of conductive material 27.

Referring also to FIG. 5C, a third projected capacitance touchscreen panel 22 is the same as the first and second projected capacitance touchscreen panels 20, 21, except that the drive and sense electrodes $D_n$, $S_m$ are different shapes. In the third projected capacitance touchscreen panel 22, the drive electrodes $D_n$ may take the form of rectangular strips which are elongated in the first direction x and which have a relatively greater width in the second direction y compared to the drive electrodes $D_n$ of the first projected capacitance touchscreen panel 20. The sense electrodes $S_m$ may take the form of a number of relatively narrow "Z-shaped" regions of conductive material 28 spaced apart in the second direction y and connected by narrow strips of conductive material 30. The drive and sense electrodes $D_n$, $S_m$ of the third projected capacitance touchscreen panel 22 are arranged so that each Z-shaped conductive region 28 of a sense electrode $S_m$ is located overlying a corresponding drive electrode $D_a$. The drive and sense electrodes $D_n$, $S_m$ of the third projected capacitance touchscreen panel 22 are dimensioned, in particular the width of each drive electrode $D_n$, so that no part of a Z-shaped conductive region 28 does not overlie a respective drive electrode $D_n$. This is sometimes referred to as a "flooded" configuration. The sense electrodes $S_m$ need not use Z-shaped conductive regions 28, and other narrow shapes overlying a drive electrode $D_n$ may be used such as, for example, "H-shaped" or "I-shaped" conductive material regions.

Electrodes labelled as drive electrodes $D_n$ in the first, second and third projected capacitance touchscreen panels may alternatively be operated as sense electrodes $S_n$ and electrodes labelled as sense electrodes $S_m$ may alternatively be operated as drive electrode $D_m$. In some examples, and electrode need not have a fixed role and may alternate between being a drive electrode and a sense electrode.

A projected capacitance touchscreen panel need not use electrode arrangements described in relation to the first, second or third projected capacitance touchscreen panels 20, 21, 22. Alternatively, any two-dimensional grid or array of electrodes suitable for measuring mutual capacitance between pairs of electrodes may be used.

Figure 6A:
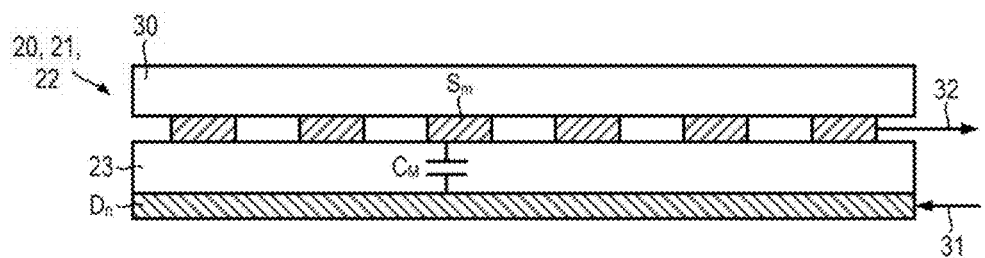
Figure 6B:
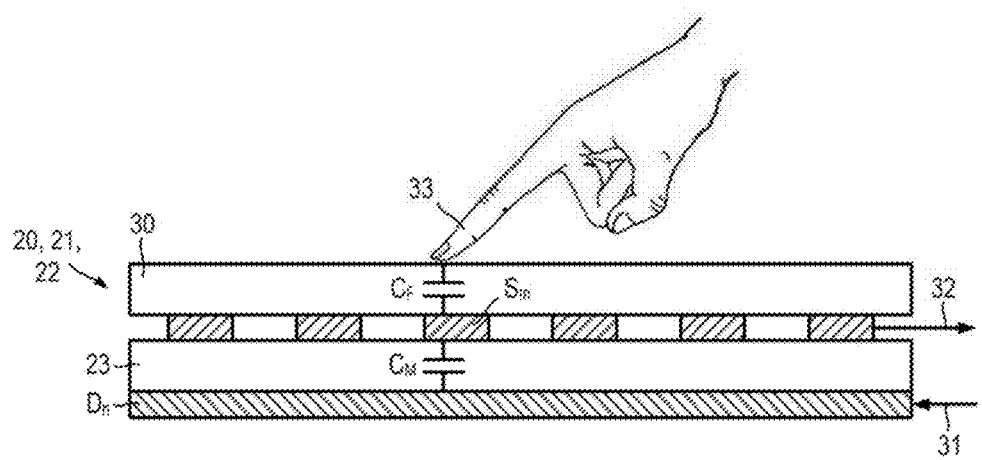
FIG. 6B schematically illustrates a projected capacitance touchscreen panel viewed side-on during a touch event.

FIG. 6A shows a schematic cross-section of a projected capacitance touchscreen panel 20, 21, 22. FIG. 6B shows a schematic cross-section of a projected capacitance touchscreen panel 20, 21, 22 during a touch event.

Referring to FIGS. 4 to 6B, the electrodes of a projected capacitance touchscreen panel o20, 21, 22 may be covered over with a cover lens 30. The cover lens 30 is generally transparent and may be formed of transparent materials such as, for example, of glass or PET.

Each intersection of drive and sense electrodes $D_n$, $S_m$ defines a sensor area $I_{n,m}$, and each intersection $I_{n,m}$ may be measure individually by the frame reading module 9 of the touch controller 7 addressing the appropriate combination of drive and sense electrodes $D_n$, $S_m$. For example, the drive electrode $D_n$ corresponding to an addressed intersection $I_{n,m}$ is driven by a driving signal 31, and am output signal 32 is read out from the respective sense electrode $S_m$ of the addressed intersection $I_{n,m}$. The driving signal 31 may take the form of a voltage signal such as, for example, a sinusoidal waveform, a square waveform, other AC/pulsed waveforms or a DC bias voltage. Each pairing of drive and sense electrodes $D_n$, $S_m$ defines an intersection which provides a sensor area $I_{n,m}$, and all of the intersections $I_{n,m}$ may be sequentially read out to measure a complete signal frame $F(n,m,k)$ from the projected capacitance touchscreen panel 20, 21, 22. In this way, both single-touch events and multi-touch events may be registered.

In the absence of a touch event, the drive and second electrodes $D_n$, $S_m$ corresponding to any given intersection $I_{n,m}$ define a baseline mutual capacitance, $C_M$. The mutual capacitance between the drive and sense electrodes $D_n$, $S_m$ is determined by the frame reading module 9 based on the driving signal 31 and the output signal 31. The frame reading module 9 may determine the mutual capacitance between the drive and sense electrodes $D_n$, $S_m$ using any known method such as, for example, based on a change in the amplitude, phase or frequency of the driving/output signals 31, 32 compared to a reference signal. Alternatively, the frame reading module 9 may determine the mutual capacitance based on the time constant and/or charging/discharging times of the drive and second electrodes $D_n$, $S_m$.

During a touch event, an additional capacitance $C_F$ couples the electrodes and the user's digit 33 or a suitable conductive stylus (not shown). The additional capacitance $C_F$ causes the mutual capacitance measured by the processor or touch controller to differ from the baseline mutual capacitance $C_M$ by an amount $\Delta C$. The magnitude of the capacitive change $\Delta C$ during a touch event is not fixed, and may vary depending upon factors such as, for example, the contact area of the user's digit 33 or the suitable conductive stylus.

In this way, a signal frame values $F(n,m,k)$ read out from a projected capacitance touchscreen panel 20, 21, 22 is an array of the values of capacitance measured for each intersection $I_{n,m}$ of the drive and sense electrodes $D_n$, $S_m$. When the amount of capacitive change $\Delta C$ exceeds a threshold amount, a touch event is registered. Noise 4 and offsets 3 will affect the measured capacitances, as previously described.

Although examples of projected capacitance touchscreen panels 20, 21, 22 using mutual capacitance have been described for reference, the first and second methods of processing output signals from touchscreen panels are not limited to projected capacitance touchscreen panels 20, 21, 22 using mutual capacitance. For example, the first and second methods of processing output signals from touchscreen panels may alternatively be used with projected capacitance touchscreen panels using self-capacitance, or with touchscreen panels based on measuring different properties such as, for example, electrical resistance or pressure. The first and second methods of processing output signals from touchscreen panels may alternatively be used with touchscreen panels based on optical or acoustic methods. The first and second methods of processing output signals from touchscreen panels may be used with any touchscreen panel 6 in which the contact area of a user's digit 33 or a stylus generates a signal from more than one sensor area $I_{n,m}$.

In a more general case, a touchscreen panel 6 may include a grid 8 formed by intersections between a number N of electrodes $X_1, \ldots, X_n, \ldots X_N$ extending in a first direction $d_1$ and a number M of electrodes $Y_1, \ldots, Y_m, \ldots, Y_M$ extending in a second direction $d_2$. When the touchscreen panel is a projected capacitance type, the electrodes $X_n$, $Y_m$ may be drive and sense electrode $D_n$, $S_m$. However, in other types of touchscreen panel the electrodes $X_n$, $Y_m$ may fulfil different roles. When a touchscreen panel 6 is a projected capacitance type, the signal frame values $F(n,m,k)$ may represent and be proportional to a capacitance or change in capacitance between the drive and sense electrodes $D_n$, $S_m$. Alternatively, when a touchscreen panel 6 is a resistance type, the signal frame values $F(n,m,k)$ may represent and be proportional to a resistance or change in resistance between the respective electrodes $X_n$, $Y_m$. Alternatively, when a touchscreen panel 6 is a force or pressure sensing type, the signal frame values $F(n,m,k)$ may represent and be proportional to a pressure or force applied between the respective electrodes $X_n$, $Y_m$.

The signal frame values F(n,m,k) need not correspond to the sensor areas $I_{n,m}$ defined by intersections between electrodes $X_n$, $Y_m$. For example, when a touchscreen panel 6 takes the form of an N by M array of discrete individually addressable sensors (not shown), the sensor areas $I_{n,m}$ may correspond to the discrete sensors so that each frame signal value F(n,m,k) corresponds to the signal obtained from a respective sensor.

In this way, the specific physical parameter represented by the signal frame values F(n,m,k) measured from a touchscreen panel 6 varies depending on the type of touchscreen panel 6. Regardless of the physical parameter represented by the frame signal values F(n,m,k), the first and second methods of processing out signals from a touchscreen panel may be applied to reduce or remove noise 4 and offsets 3 to improve the SNR and reduce mis-registrations of touch events.

Theoretical Analysis of Touchscreen Panel Noise Sources

Without wishing to be bound by theory, it may aid understanding of the first and second methods of processing output signals from touchscreen panels 6 to briefly discuss a theoretical treatment of SNR for a touchscreen panel 6.

Signal-to-noise ratio (SNR) is a parameter used to represent a system's detection accuracy and resolution. The SNR is defined as the ratio:

$$SNR = \frac{P_s}{P_n}$$

in which SNR is the signal to noise ratio, $P_s$ is the signal power and $P_n$ is the noise power. In this way, a SNR>1 implies that the touch signal, for example F(n,m,k) exceeds the noise 4. The offset 3 is not dealt with as a noise component, as it can be removed by deducting a fixed value. This is because the noise 4 typically varies rapidly, whereas the offsets 3 are typically constant or slowly varying. Depending on the type of touchscreen panel and the application, an acceptable value of the SNR may be greater than 1, greater than 2, greater than 3 or greater than 5. A lower SNR, for example SNR>1 may be acceptable in some applications, for example when only the registration of the presence or absence of a touch event is measured. However, for other applications, for example, for analog pressure sensing/force touch, a greater SNR may be needed to allow different levels of pressure applied by a user's interaction to be distinguished.

Figure 7A:
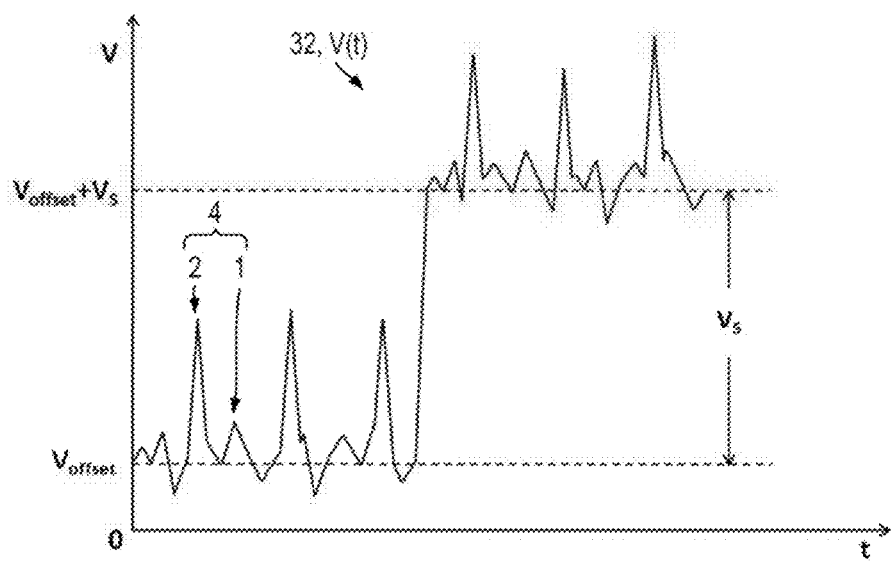
FIG. 7A schematically illustrates a voltage output signal from a projected capacitance touchscreen panel.
Figure 7B:
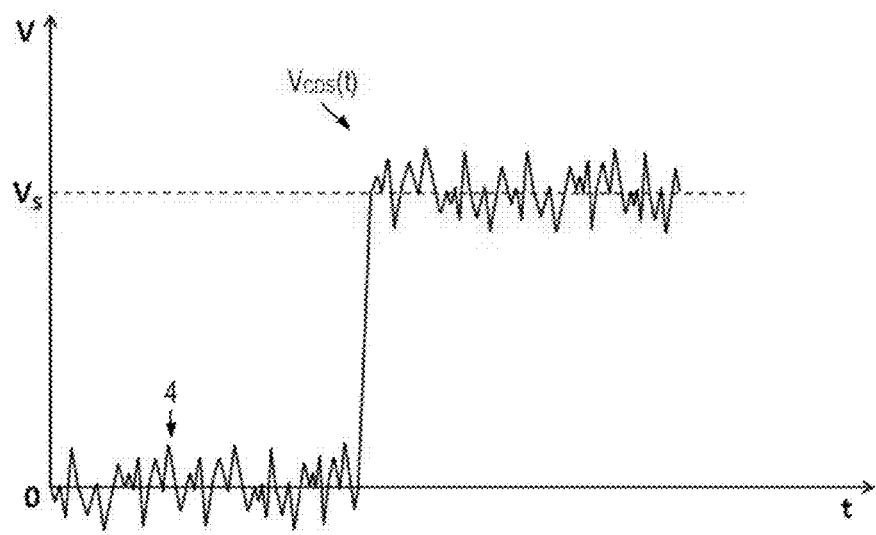
FIG. 7B schematically illustrates a correlated double sampled voltage signal from a projected capacitance touchscreen panel.

FIGS. 7A and 7B schematically illustrate voltage output signals from a projected capacitance touchscreen panel 20, 21, 22.

Referring to FIG. 7A, the output signal 32 from an intersection $I_{n,m}$ of a projected capacitance touchscreen panel 20, 21, 22 may take the form of a voltage signal V(t). The output signal V(t) generally includes contributions from a desired touch signal, $V_s$, from an offset 3, $V_{offset}$ and from a noise signal 4. The noise 4 is a superposition of stochastic or random noise 1 and deterministic or common mode noise 2. The output signal V(t) may be corrected using correlated double sampling (CDS) to determine a corrected output signal $V_{CDS}$(t). To apply CDS, a signal is recorded when there is no touch event occurring in order to determine a background signal $V_0$.

Referring also to FIG. 7B, the background signal $V_0$ may be subtracted. In the corrected output signal $V_{CDS}$(t), the offset 3 and components of the noise 4 which are correlated between the output signal V(t) and the background signal $V_0$ may be substantially reduced or cancelled. For example lower frequency components of the noise 4. The corrected output signal $V_{CDS}$(t) substantially includes the desired signal $V_s$ and higher frequency uncorrelated components of the noise 4. After CDS, the SNR may be expressed as:

$$SNR_{CDS} = \frac{P_s}{P_n'} = \frac{P_s}{P_n/\alpha}$$

in which $SNR_{CDS}$ is the signal to noise ratio after CDS, $P_s$ is the signal power, $P_n$ is the noise power before CDS, $P_n'$ is the noise power after CDS and $\alpha$ is a characterization factor defined as the ratio of $P_n$ to $P_n'$.

In the first and second methods of processing output signals from a touchscreen panel, CDS is applied to the frame signal values F(n,m) from each intersection $I_{n,m}$ using an individual background reference value $F_0$(n,m).

FIG. 21 illustrates different ranges of the characterization factor $\alpha$ applied to a case of a harmonic, single frequency, common-mode noise signal.

Referring also to FIG. 21, in the ideal case, if two samples are obtained at the same time, then common-mode noise could be completely cancelled. Thus it might be considered that faster sampling can always provide improvements in SNR. However, in practice faster sampling might not always improve the SNR. For example, if the common-mode noise takes the form of a harmonic, single frequency, waveform, faster sampling does not necessarily imply an improvement in SNR, for example when 0<α<1 or when α=1. In this way, application of CDS may reduce or remove offsets 3 and low-frequency common-mode components of the noise 4. However, CDS may result in increased amplitude of higher frequency components of the noise 4. When CDS does results in higher frequency noise, this may be compensated to an extent using a low pass filter because touch signals are typically of relatively low frequency.

Figure 8:
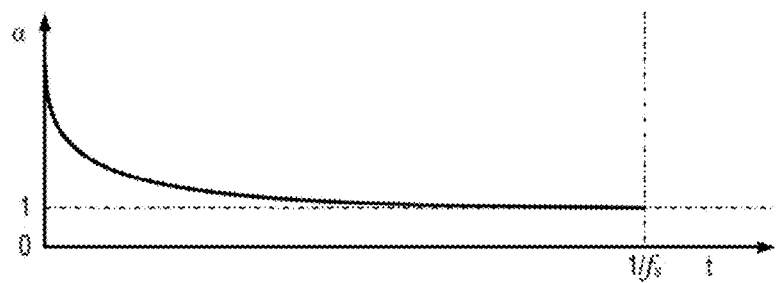
FIG. 8 schematically depicts a relationship between an improvement in signal-to-noise-ratio and sampling frequency for correlated double sampling.

FIG. 8 schematically depicts the relationship between the characterization factor $\alpha$ and the scan frequency, $f_s$.

Referring to FIG. 8, if the scan frequency $f_s$ is sufficiently high compared to the main common-mode components of the noise 4, so that α>1, then the characterization factor α may be considered to be inversely proportional to the scan interval $1/f_s$.

First Method of Processing Output Signals from a Touchscreen Panel

Figure 9:
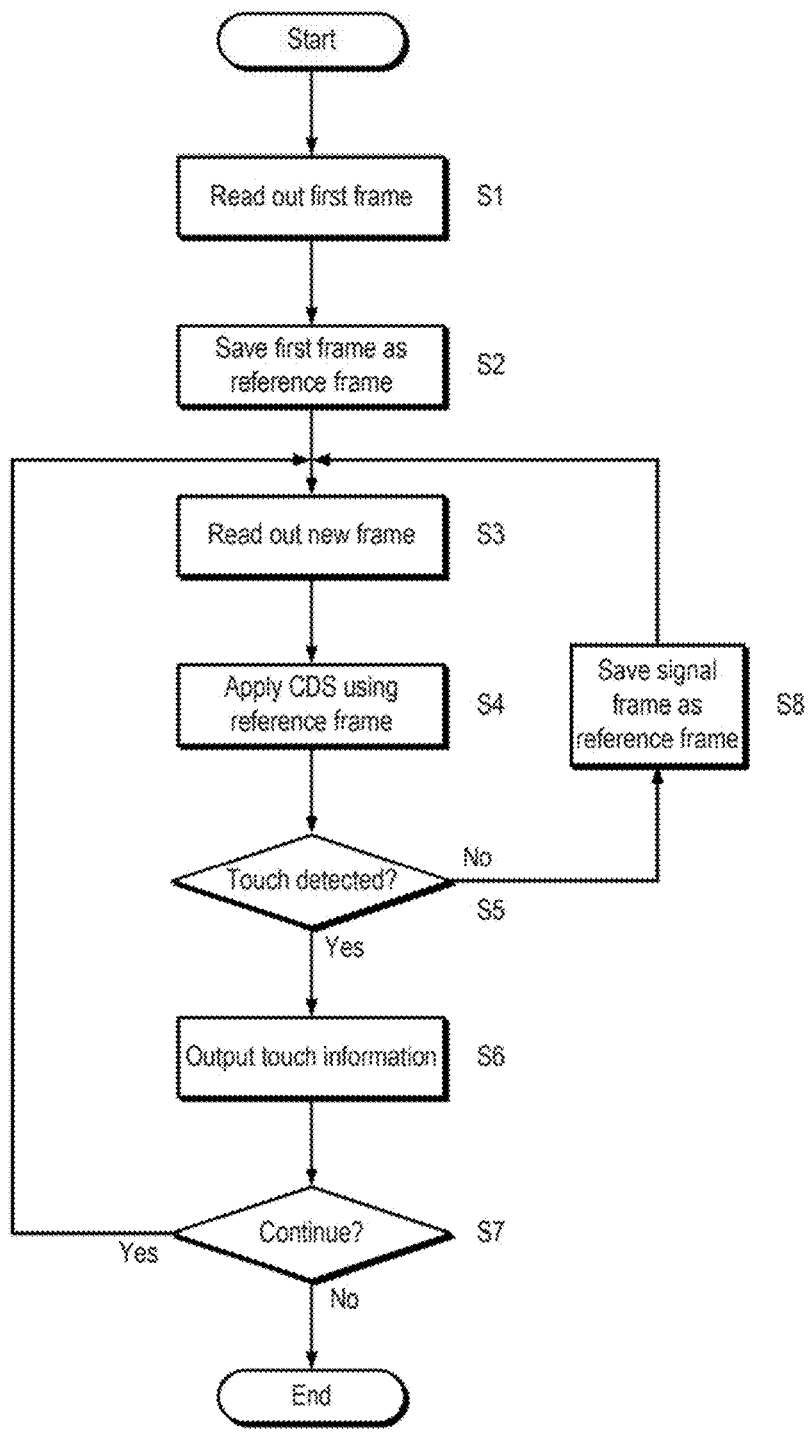
FIG. 9 shows a process flow diagram for a first method of processing output signals from a touchscreen panel.

FIG. 9 shows a process flow diagram of a first method of processing output signals F(n,m,k) from a touchscreen panel 6.

Referring to FIGS. 4 to 6B and FIG. 9, upon start-up of a touchscreen system 5, a first frame F(n,m,1) is read out by frame reading module 9 (step S1). When the touchscreen panel 6 is a projected capacitance touchscreen panel 20, 21, 22, the first frame F(n,m,1) is read out by sequentially scanning through each intersection $I_{n,m}$ by addressing the corresponding drive and sense electrodes $D_n$, $S_m$. A background pattern or reference frame $F_0$(n,m) is initially set equal to the first frame F(m,n,1), and stored in the reference frame store 11 (step S2).

Whilst the touchscreen system 5 is operating, the frame reading module 8 reads out signal frames F(n,m,k) (step S3). When the touchscreen panel 6 is a projected capacitance touchscreen panel 20, 21, 22, the signal frame F(n,m,k) is read out by sequentially scanning through each intersection $I_{n,m}$ by addressing the corresponding drive and sense electrodes $D_n$, $S_m$. The read out of the signal frame F(n,m,k) may be synchronised with a display (not shown) which underlies the touchscreen panel 6 or into which the touchscreen panel 6 is embedded. For example, the signal frame F(n,m,k) may be read out during a display quiet/blinking period.

The correlated double sampler 10 receives the signal frame F(n,m,k) and applies a CDS correction by subtracting the reference frame $F_0$(n,m) to generated a corrected frame $F_{CDS}$(n,m,i) according to Equation 1 (step S4). The CDS correction may be effective in reducing or removing offsets 3 because the offsets are constant or only slowly vary between reading out successive frames F(n,m,k), F(n,m,k+1). The CDS correction may be effective in reducing or removing low-frequency common-mode components of the noise 4 which are correlated between successive frames F(n,m,k), F(n,m,k+1).

The touch decision module 12 receives and analyses the corrected frame $F_{CDS}$(n,m,k) to determine whether a touch event, for example a single-touch event or a multi-touch event is occurring (step S5). If a touch event is not occurring (step S5; No), the reference frame $F_0$(n,m) is updated by overwriting the reference frame $F_0$(n,m) stored in the reference frame store 11 with the current signal frame F(n,m,k) (step S8), and the next signal frame F(n,m,k+1) is read out by the frame reading module 9 (step S3).

If a touch event is occurring (step S5; Yes), the touch decision module determines and outputs the touch information 18 to the device CPU 19 (step S6). For example, the touch information can be used by an application of operating system being executed by the device CPU 19 to select an option, open a folder on desktop or to close a web browser application. Whilst the touchscreen system 5 continues operating (step S7), the next signal frame F(n,m,k+1) is read out (step S3).

The steps occurring between reading out a signal frame F(n,m,k) and reading out a subsequent signal frame F(n,m,k+1) (steps S4 to S8) are preferably conducted in less time than the scan interval $1/f_s$. For example, if signal frames are read out during display quiet/blanking periods, then the steps occurring between reading out a signal frame F(n,m,k) and reading out a subsequent signal frame F(n,m,k+1) (steps S4 to S8) preferably do not take longer than the interval between display quiet/blanking periods.

In this way, CDS may be applied to signal frames read out from a touchscreen panel 6 in order to reduce or cancel offsets 3 and low frequency common-mode components of noise 4. This may improve the SNR of the touchscreen system 5 and enable the excitation power and/or detection thresholds to be reduced for the touchscreen system 5. This may extend the battery life of a device incorporating the touchscreen system by reducing power consumption. Improved SNR of the touchscreen system 5 may also improve the accuracy of a touchscreen system 5 by reducing the probability of mis-registering a touch event. In addition, by dynamically refreshing the reference frame $F_0$(m,n) when a touch event is not detected, the reference frame $F_0$(n,m) is kept up to date with the most recent, and thus most accurate, background pattern of noise and offsets. This may enable the signal frames F(n,m,i) read out from a touchscreen panel 6 to be corrected using CDS for extended periods of time by dynamically compensating for slow variations in the offsets 3 due from drift in the electronics or changes in the ambient environment. Changes in the ambient environment may encompass changes in the number, type and proximity of sources of electromagnetic noise, changes in temperature, or changes such as plugging in or unplugging a mobile device incorporating the touchscreen system 5 from a charging cable.

Example of Using the First Method of Processing Output Signals from a Touchscreen Panel The use of the first method of processing output signals from a touchscreen panel may be illustrated with reference to experiments conducted using an example of a projected capacitance touchscreen panel.

FIG. 22 is a table providing details of the projected capacitance touch screen panel used for testing the first method of processing output signals from a touchscreen panel.

Referring to FIGS. 5A to 5C and FIG. 22, experiments were conducted using an example of a projected capacitance touchscreen panel having eighty drive electrodes $D_n$ (also referred to as transmission or "Tx" electrodes) and eighty sense electrodes $S_m$ (also referred to as receiving or "Rx" electrodes). The experimental touchscreen panel used drive and sense electrodes $D_n$, $S_m$ configured in a grid including relatively wide drive electrodes $D_n$ and relatively narrow sense electrodes $S_m$ deposited on the same surface and perpendicular to the drive electrodes $D_n$. At each intersection $I_{n,m}$ the drive electrodes $D_n$ tapered to a waist, and the sense electrodes $S_m$ bridges the drive electrode $D_n$ waists by means of jumpers. The experimental touchscreen panel was rectangular, with a diagonal dimension of 10.1 inches (25.7 cm) and had an aspect ratio of 16:9. The excitation voltage for the drive electrodes $D_n$ was 10 V. The drive electrodes $D_n$ had a width of 3 mm. The portions of the sense electrodes $S_m$ which overlapped the drive electrodes $D_n$ had a maximum width of 449 μm. The drive and sense electrodes $D_n$, $S_m$ formed a sensing array grid 8 in which the intersections $I_{n,m}$ had an active area of 3 mm by 3 mm and sensor areas $I_{n,m}$ were spaced apart with gap of s=2 mm. Signal frames F(n,m,i) were read out at a frequency of 30 Hz or 60 Hz. The pixels of a display underlying the example touchscreen panel had dimensions of 56 μm by 56 μm.

Figure 10B:
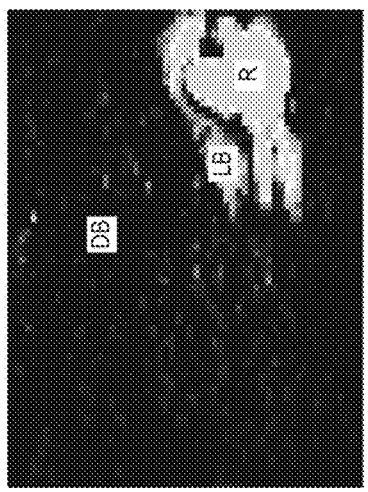
FIG. 10B illustrates a signal from a single-touch event following correlated double sampling.
Figure 10D:
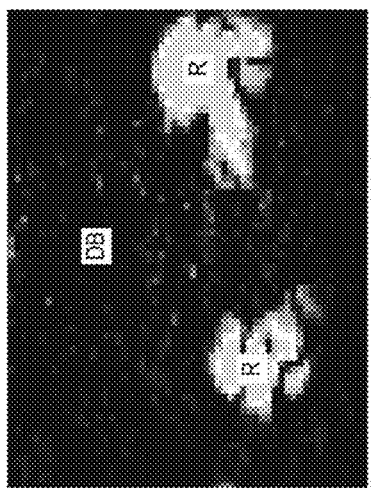
FIG. 10D illustrates a signal from a multi-touch event following correlated double sampling.
Figure 10A:
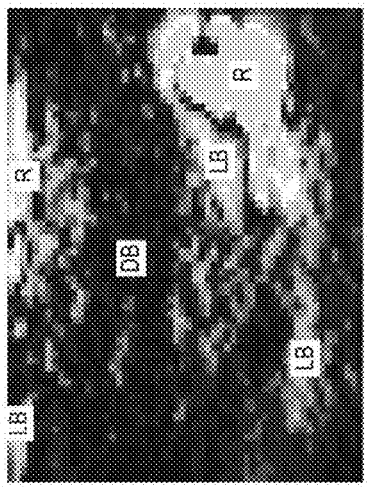
FIG. 10A illustrates a signal from a single-touch event.
Figure 10C:
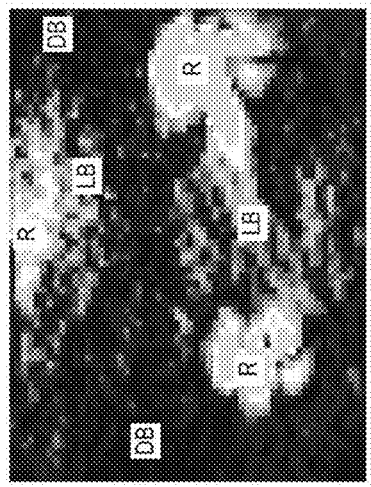
FIG. 10C illustrates a signal from a multi-touch event.

FIGS. 10A and 10B show grayscale illustrations of a single-touch event frame 34 and a corresponding CDS corrected single-touch event frame 35. FIGS. 10C and 10D show grayscale illustrations of a multi-touch event frame 36 and a corresponding CDS corrected multi-touch event frame 36. In grayscale plots illustrating touchscreen panel signal frames, regions labelled "DB" correspond to low signal levels, regions labelled "LB" correspond to intermediate signal levels and regions labelled "R" correspond to high signal level.

Referring also to FIGS. 10A and 10B, applying the first method of processing output signals from a touchscreen panel to a single-touch event frame 34 results in a significant reduction in offsets 3 and noise 4 of the corresponding CDS corrected single-touch event frame 35.

Referring also to FIGS. 10C and 10D, applying the first method of processing output signals from a touchscreen panel to a multi-touch event frame 36 results in a significant reduction in offsets 3 and noise 4 of the corresponding CDS corrected multi-touch event frame 37.

In particular, the contrast of the touch signals is substantially improved in the CDS corrected frames 35, 37 processed according to the first method of processing output signals from a touchscreen panel. As a result, accurately determining the number and locations of touch events may be improved. Additionally, significant offset 3 signals which could lead to false registration of touch events, for example the regions coloured red towards the upper portion of the uncorrected signal frames 34, 36, are removed by the processing according to the first method.

Figure 11A:
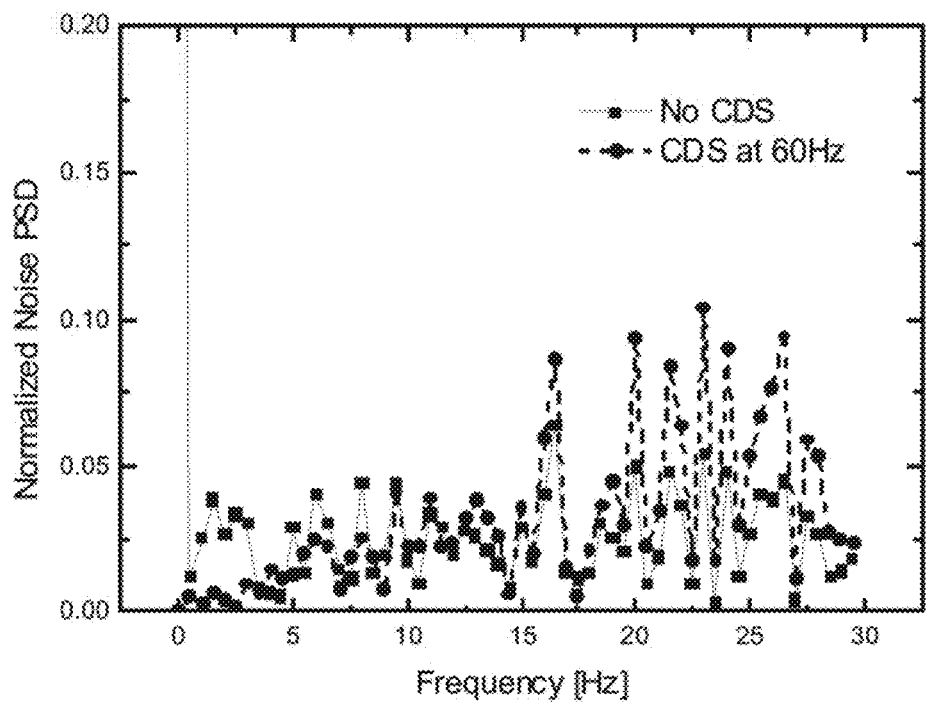
FIG. 11A shows a power spectral density plot of normalised noise output from experiments conducted using the first method with a projected capacitance touchscreen panel with a scan frequency of 60 Hz.
Figure 11B:
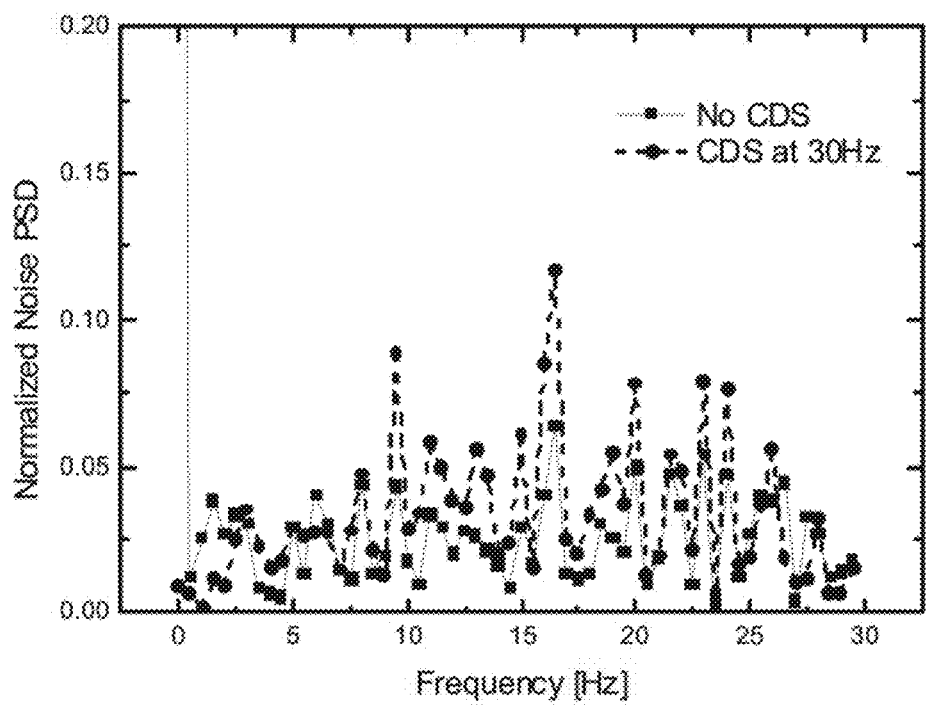
FIG. 11B shows a power spectral density plot of normalised noise output from experiments conducted using the first method with a projected capacitance touchscreen panel with a scan frequency of 30 Hz.

FIGS. 11A and 11B show power spectral density (PSD) plots of the normalised noise output from the experimental touchscreen panel at 60 and 30 Hz respectively. Normalised noise refers to signal frames recorded without any touch events.

Referring to FIG. 11A, the effect of the first method on the noise properties of the experimental touchscreen panel was investigated by reading out signal frames F(n,m,k) in the absence of any touch events. Without touch events, and hence without touch signals, the read out frames F(n,m,k) consist substantially of noise 4 and offsets 3. The effects of the first method may be investigated by calculating and comparing the PSD of the signal frames F(n,m,k) and the corrected frames $F_{CDS}$(n,m,k) in the absence of any touch events.

Without CDS correction according to the first method, a strong DC component is observed due to the offsets 3. Below about 8 Hz, application of the first method at a scan frequency of $f_s$=60 Hz results in a significant reduction in the noise power. Between about 9 Hz and about 17 Hz, the noise power for corrected frames $F_{CDS}$(n,m,k) appears to be comparable to the noise power for uncorrected frames F(n,m,k). Above about 18 Hz, the noise power for corrected frames $F_{CDS}$(n,m,k) appears to be exceed the noise power for uncorrected frames F(n,m,k).

Referring also to FIG. 1B, when the same comparison is conducted for a scan frequency of $f_s$=30 Hz, the frequency range in which an improvement is observed after correction using the first method is reduced to below about 3 Hz. The reduced frequency range of improvements at reduced scan frequency $f_s$ may result from a relatively weaker correlation of low-frequency noise between adjacent frames at reduced sampling frequencies. The correlation of noise between adjacent frames may be relatively increased for higher sampling frequencies. Because the offsets 3 behave as DC, they can be cancelled regardless of sampling frequency.

As explained hereinbefore, CDS may have the effect of introducing higher frequency noise within a certain bandwidth. This effect is related to the sampling frequency and will be explained with reference to the following example, in which a harmonic, single frequency, noise waveform, H(t), with a frequency $f_s$/2, is subject to CDS correction at a scan frequency $f_s$. The interval between two adjacent sampling times is then equal to phase of π. In this example, the output after CDS may be expressed as:

$$H_{CDS} = H_0 \sin\left(2\pi \frac{f_s}{2} t + \varphi + \pi\right) - A\sin\left(2\pi \frac{f_s}{2} t + \varphi\right)$$

$$H_{CDS} = -H_0 \sin(\pi f_s t + \varphi)$$

In which $H_{CDS}$ is the noise signal after applying CDS, $H_0$ is amplitude of the noise waveform H(t), φ is the initial phase of the noise waveform H(t) and t is time. Equation 5 indicates that a noise waveform, for example H(t) having a frequency $f_s$/2 of half the CDS sampling frequency $f_s$, the amplitude of the noise waveform $H_{CDS}$ after CDS is doubled. Similar analysis can be made for other ratios of noise waveform and scan frequency $f_s$.

The modest in noise components at higher frequencies as a result of applying the first method may be mitigated by filtering out higher frequency components. This is possible because signals corresponding to touch-events are typically low frequency, for example, user interactions with a touchscreen panel typically occur at frequencies a few Hz or less. The experimental results show that up to about 10% of the scan frequency $f_s$, the SNR may be boosted by 5.9 dB and 7.6 dB when the scan frequencies $f_s$ are 30 Hz and 60 Hz, respectively. Above about 10% of the scan frequency $f_s$, the SNR does not improve and may even be degraded.

In this way, the first method of processing output signals from a touchscreen panel may substantially reduce common-mode components of noise 4 and offsets 3 within the frequency band containing touch signals.

Time Budget for the First Method

The first method of processing output signals from a touch panel may remove or reduce of offsets 3 and low frequency common-mode components of the noise 4. The time taken for the repeated steps of the first method (FIG. 8, steps S4 to S8) should preferably not exceed the scan interval 1/$f_s$ between reading out successive signal frames F(m,n,k), F(m,n,k+1). For example, for a scan frequency of 60 Hz, the computational time for the CDS correction of the first method should be less than 16.7 ms.

Computational time generally depends on the complexity of an algorithm. The number of intersections $I_{n,m}$ to be scanned for the touchscreen panel 6 is N×M. The computational time of the first method scales as O(N×M). For the experimental touchscreen panel described hereinbefore, N=80 and M=80 so that N×M=6,400. The processors in many currently available mobile devices include processors having a computational ability in the range of GHz. For example, when N×M=6,400, a 1 GHz processor would take ~6.4 μs to execute the repeated steps of the first method (FIG. 8, steps S4 to S8).

In this way, the first method may be implemented in a device incorporating a touchscreen system 5 without the need to reduce the scan frequency $f_s$.

Energy Budget for the First Method of Processing Output Signals from a Touchscreen Panel The energy for measuring a signal frame value F(n,m,k) for each sensor area $I_{n,m}$ is given approximately by:

$$E = \frac{P}{f_s}$$

in which E is the energy for measuring one sensor area $I_{n,m}$ P is the frame reading module 9 power use and $f_s$ is the scan frequency. For example, if a frame reading module 9 scans intersections at a frequency of $f_s$=75 kHz and has a power consumption of 2.5 mW, then E=1/30 μJ would be needed to read each intersection $I_{n,m}$.

For example, if a touchscreen panel 6 included an N by M grid 8, the total power ($P_{total}$) for scanning the each intersection $I_{n,m}$ may be expressed as:

$$P_{total} = (ENM)f_s$$

in which P is the processor or touch controller power use, E is the energy for measuring one intersection, N and M are grid 8 dimensions and $f_s$ is the scan frequency.

For example, if a projected capacitance touchscreen panel for a typical mobile device, for example a smartphone, includes nine electrodes Xn in a first direction x and sixteen electrodes Yn in a second direction y, then the capacitive touchscreen panel would have 144 electrode sensor areas/intersections In,m. In such an example, if the touchscreen panel of the smartphone was scanned at a frequency fs=60 Hz, then the power consumption for measuring the whole panel once would be 0.288 mW, and the energy consumption for scanning each signal frame F(n,m,k) would be 4.8 μJ. The power consumption for processing operations associated with the first method is given approximately by:

$$E_{CDS} = \frac{N \times M}{\eta}$$

In which $E_{CDS}$ is the power consumption of the CDS operation, N and M are grid 8 dimensions and η is the power efficiency of the processor or touch controller Examples of currently used embedded processors, for example an ARM®Cortex®A5 processor, have a power efficiency η in the range of 20 million instructions per second (MIPS)/mW. Thus, the power consumption ECDS may be of the order of 7.2 nW, and the computation time is of the order of 0.14 μs. In this way, the additional energy consumption from applying the first method is of the order of 1 fJ, which is substantially smaller than the energy consumption of commonly used processors or touch controllers.

Spatial Filtering to Remove Noise-Spikes

As explained hereinbefore, the first method of processing output signals from a touchscreen panel 6 may provide substantial improvements in offsets 3 and low frequency common-mode components of the noise 4. However, when the correlation between a signal frame F(n,m,k) and the noise reference frame $F_0$(n,m) becomes weak, noise spikes may remain, especially at higher frequencies. When the characteristics of touch signals and noise spikes were analysed, it was noticed that the signal from a touch event may have a lower spatial frequency compared to the noise spikes.

A second method of processing output signals from a touchscreen panel combines CDS correction of signal frames F(m,n,k) according to the first method with spatial filtering of the corrected frames $F_{CDS}$(n,m,k) using a spatial low pass filter 13.

Before explaining the second method, it may be helpful to briefly discuss spatial filtering of the corrected frames $F_{CDS}$(n,m,k) in general.

Figure 12:
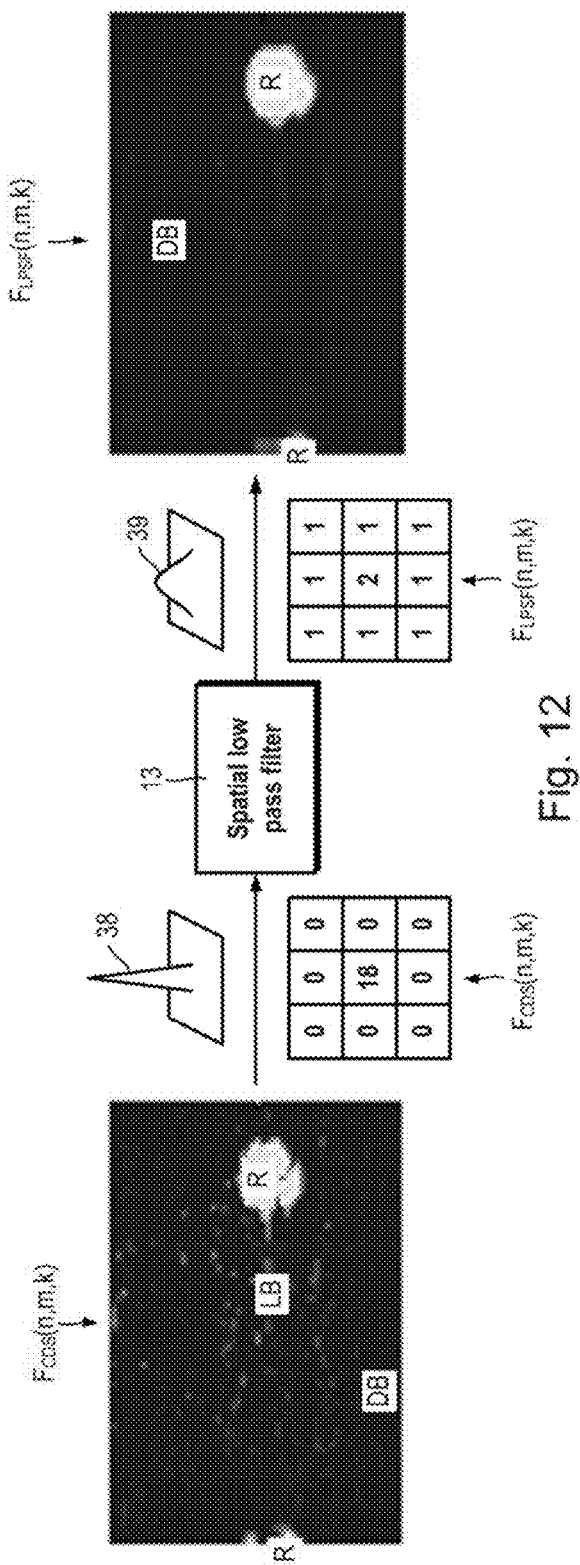
FIG. 12 illustrates spatial filtering to reduce the magnitude of noise spikes.

FIG. 12 illustrates spatial filtering to reduce the magnitude of a noise spike. In grayscale plots illustrating touchscreen frames, regions labelled "DB" correspond to low signal levels, regions labelled "LB" correspond to intermediate signal levels and regions labelled "R" correspond to high signal level.

Referring to FIGS. 1, 4 and 12, a corrected signal frame $F_{CDS}$(n,m,k) may include noise spikes 38 which result from, for example, random components of noise 4 or high frequency common mode components of noise 4 which are uncorrelated with the reference frame $F_0$(n,m) used for the CDS correction. A noise spike 38 may take the form of, for example, an abnormally high signal value $F_{CDS}$(n,m,k) at an intersection $I_{n,m}$ when compared to the signal values, e.g. $F_{CDS}$(n+1,m,k), $F_{CDS}$(n,m+1,k) etc, at surrounding intersections, e.g. $I_{n+1,m}$, $I_{n,m+1}$ etc. When the frames are treated as images herein, the values at intersections may also be referred to as "pixel" values. The corrected frame $F_{CDS}$(n, m,k) may be processed using a spatial low pass filter 13 to produce a filtered frame, $F_{LPSP}$(n,m,k). The spatial low pass filter 13 has the effect of averaging the noise spike 38 by mixing it with adjacent intersection values, resulting in a filtered spike 39 with reduced magnitude.

Spatial filtering to touch signals has the potential to introduce unwanted effects. For example, the touch signal may also be reduced by the spatial low pass filter 13, sometimes referred to as a "smoothing effect", which may decrease SNR and potentially increase the probability of failing to register a touch. The smoothing effect has the potential to distort the apparent location of a touch due to the coupling to the signal values for adjacent/nearby intersections $I_{n,m}$. Careful design of spatial low pass filter 13 may allow noise spikes 38 to be attenuated whilst minimizing the attenuation of the touch signals and avoiding distortion of the touch location.

In addition, different users may have digits 33 which present different contact areas to a touchscreen panel 6. The same user may vary which digits 33 contact the touchscreen panel and may sometimes use a stylus (not shown) instead of a digit 33. Application of a single bandwidth for the spatial low pass filter 13 may not be suitable for all possible users and/or styluses. In the second method of processing output signals from a touchscreen panel, the bandwidth of a spatial low pass filter 13 is dynamically tuned during use to optimise between attenuating noise spikes 38 and preserving the integrity of touch signals.

Common Mode Noise Sources

Before explaining the second method of processing output signals from a touchscreen panel 6, it may be helpful to briefly discuss typical sources of common mode noise in touch screen panels 6 overlying or incorporated into displays of a device, and in particular mobile devices such as smartphones, tablet computers, laptops and the similar devices.

Charger Noise

Devices which incorporate touchscreen panels are frequently mobile devices which may operate under battery power in use. Such battery operated devices typically include rechargeable batteries, and must be periodically connected to a charging supply or charger (not shown) in order to replenish the battery. The device may still be used whilst connected to the charger. Chargers commonly take the form of a transformer-rectifier circuit which converts high voltage AC power from an outlet into DC power at a voltage suitable for recharging the battery of a device. In an ideal charger, the conversion would be perfect and the charger would output a constant DC voltage. In practice, a charger will produce an output including common-mode fluctuations such as, for example, residual "ripple" current/voltage, noise spikes and other artefacts The peak common mode noise introduced by a charger may typical vary within a range from less than 3 V to more than 40 V, depending on the quality of the charger. Common-mode noise from a charger may not affect the operation of a capacitive touchscreen panel 20, 21, 22 when it is not being touched because the difference of the charger output is maintained. When a touch event occurs, there are broadly two scenarios. First, the device incorporating the touchscreen panel 6 may be held by a hand. Second, the device incorporating the touchscreen panel 6 may be placed on surface or in a holder, for example on a table or a stand. When the device is held, it may be sufficiently grounded to the earth so that common-mode noise charge does not escape to ground. However, if the touchscreen panel 6 is placed on a surface or in a holder, i.e. when the touch panel and the human body do not share the same ground, the touch event generated by a finger may lead to touch mis-registrations.

Display Panel Noise

Device which incorporate a touchscreen system 5 typically include a display or screen. Different types of displays are available such as, for example, active-matric organic light-emitting diodes (AMOLED) and liquid crystal (LC) architectures. Although AMOLED displays are high quality and generate less noise for an overlying or incorporated touchscreen panel 6, LC displays are still used because they are typically lower cost.

Figure 13:
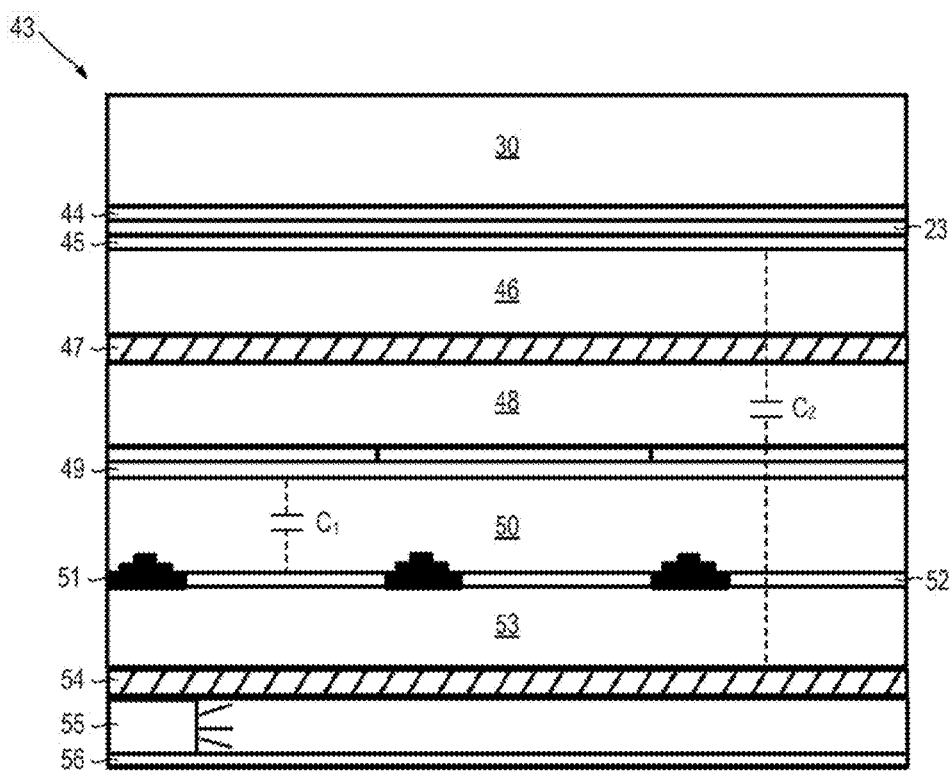

FIG. 13 shows an example stack-up 43 for a back-lit LC display incorporating a touchscreen panel which overlies an LC display.

Referring to FIGS. 6A and 6B and FIG. 13, an example of an LC display stack-up 43 includes, in order moving away from a user, a cover lens 30, a first electrode layer 44, a layer of dielectric material 23, a second electrode layer 45, a touchscreen panel substrate 46, a first polarizer filter 47, a colour filter substrate 48, a common electrode, $V_{com}$, layer 49, liquid crystal layer 50, thin film transistors (TFT) 51, pixel/sub-pixel electrodes 52, a TFT substrate 53, a second polarizer filter 54, a while backlight 55 and a reflector layer 56. The first patterned conductive layer 44 provides, for example, a number N of electrodes $X_n$ extending in a first direction $d_1$ and the second patterned conductive layer 45 provides, for example, a number M of electrodes $Y_m$ extending in a second direction $d_2$. The TFTs 51 are individual addressable and control the pixel/sub-pixel electrodes 52 to allow local re-orientation of liquid crystal molecules in the region of the liquid crystal layer 50o between the addressed pixel/sub-pixel electrode 52 and the $V_{com}$ electrode 49.

In the example LCD stack-up 43, two capacitances $C_1$, $C_2$ may be identified. The first capacitance $C_1$ couples the pixel/sub-pixel electrodes 52 and the $V_{com}$ layer 49. The first capacitance $C_1$ shields the display noise because the $V_{com}$ layer 49 has considerable resistance. For example, the $V_{com}$ layer 49 may be made from ITO. The second capacitance $C_2$ couples the $V_{com}$ layer 49 and the second electrode layer 45. The second capacitance $C_2$ couples noise from the LC display to the touchscreen panel 6.

The amount of coupled noise from an LC display may be measured by detecting a voltage induced in a conducting strip stacked directly onto an LC display. For example, an experiment was conducted using a copper strip stacked directly on an LC display in the form of a Dell® e198 wfp LCD screen. The LC display noise coupled to the copper strip was measured using an Agilent®DSO-X 2024A oscilloscope. The area of the copper strip was 3 mm×3 mm, which is a comparable area to the active area $A_s$ of a typical projected capacitance touchscreen panel 20, 21, 22.

Figure 14:
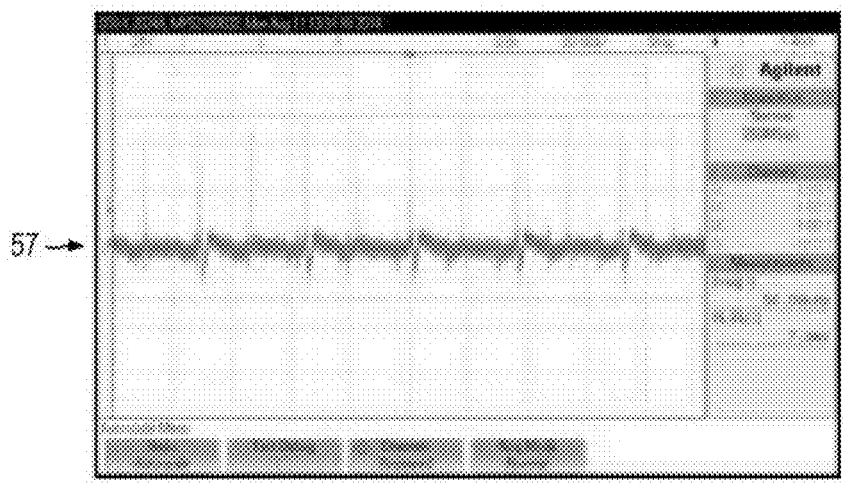
FIG. 14 shows an oscilloscope trace of noise from an LC display detected by a copper strip placed over the LC display.

FIG. 14 shows an oscilloscope trace of noise from an LC display detected by a copper strip placed over the LC display.

Referring also to FIG. 14, the experimentally measured LC display noise signal 57 includes a strong deterministic component, which is expected to depend on the design of the product and to not significantly vary after the display is fabricated.

Low-Pass Spatial Filters

It may be helpful in understanding the second method to briefly discuss the properties of spatial low pass filters. Spatial low pass filters may be broadly characterised as linear filters or non-linear filters. Linear filters include filter types such as average filters and Gaussian filter. Non-linear filters include filter types such as median filters.

Figure 15:
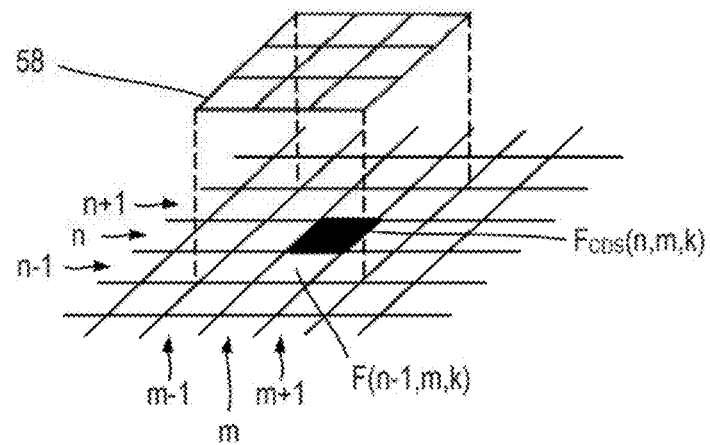
FIG. 15 schematically illustrates applying a mask for a linear spatial low pass filter to an array of signal values.
Figure 15:
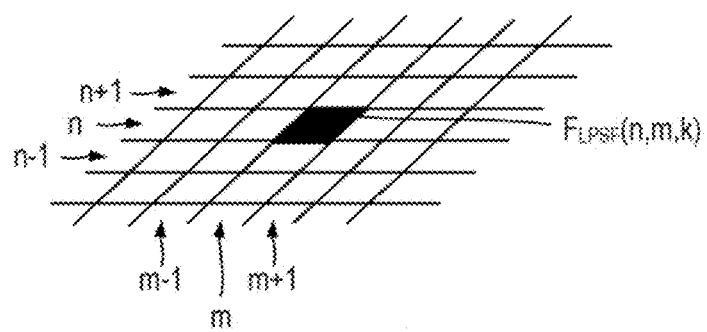
Figure 17A:
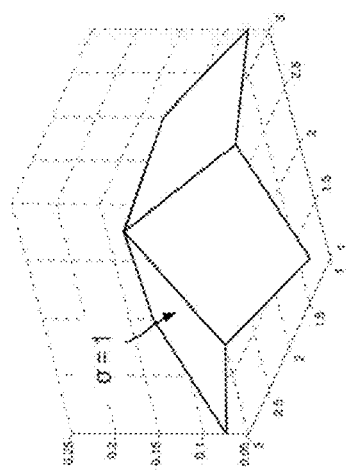
FIGS. 17A to 17D is a projection surface plot of the coefficients of a Gaussian filter mask with standard deviations of 0.5, 1, 2 and 4 respectively.
Figure 17B:
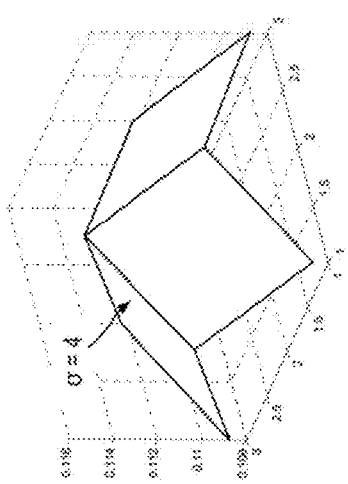
Figure 17C:
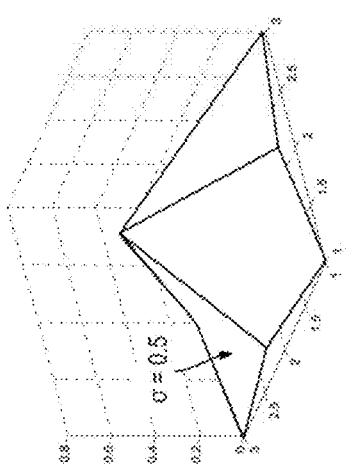
Figure 17D:
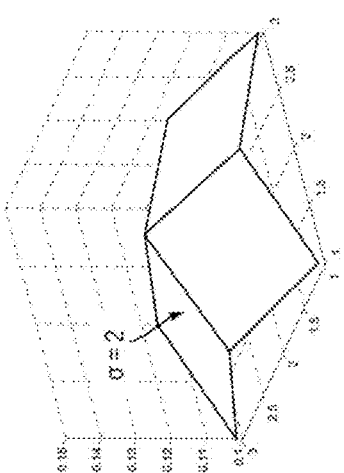

FIG. 15 schematically illustrates applying a mask 58 for a linear spatial low pass filter 13 to an array of corrected frame values $F_{CDS}(n,m,k)$.

Referring to FIG. 15, a linear filter mask 58 is applied to an array of corrected frame values $F_{CDS}(n,m,k)$. The linear filter mask 58 has dimensions L by W, which are typically positive odd integers to ensure that a single intersection $I_{n,m}$ is the centre of the linear filter mask 58. A linear filter mask 58 may be represented as an array or matrix of coefficients $C_{i,j}$, where $0 \le i \le L-1$ and $0 \le j \le W-1$ are integer suffixes. For example, for an average filter with dimensions L=3 by W=3, the coefficients may all have the value $C_{i,j}=\frac{1}{9}$, so that the mask 58 may be represented by the matrix:

$$C = \frac{1}{9}\begin{pmatrix} 1 & 1 & 1 \\ 1 & 1 & 1 \\ 1 & 1 & 1 \end{pmatrix}$$

When L and W are odd integers, the filtered signal value $F_{LPSF}(n,m)$ obtained by filtering may be expressed as:

$$F_{LPSF}(n,m) = \sum_{i=0}^{L-1} \sum_{j=0}^{W-1} C_{i,j} \times F_{CDS}\left(n+i-\frac{L-1}{2}, m+j-\frac{W-1}{2}\right)$$

which is identical to equation 2. For corrected frame values $F_{CDS}(n,m,k)$ at edges and corners, i.e. when n=1 or n=N and m=1 or M, different mask coefficients $C_{i,j}$ may be used.

The optimal linear filter mask 58 dimensions L, W and coefficients $C_{i,j}$ for a given touchscreen panel 6 may depend upon the both the physical characteristics of the touchscreen panel 6 and the characteristics of the touch events such as the contact area of the user's digit 33 or of a suitable stylus.

Linear filters as described in Equations 9 and 10, for example average or Gaussian filters, are preferred in general applications due to the simplicity of implementation, low processing requirements and balanced performance between digit 33 touches and stylus touches.

Non-linear filters involve, for example, derivation of a filtered value using statistics such as determining a median value. Non-linear filters may be preferred for some applications because non-linear filters may potentially provide superior attenuation of noise spikes. However, non-linear filters may excessively attenuate signals of touch events corresponding to low contact areas, for example a stylus touch.

Theoretical Analysis of Spatial Low Pass Filtering

Without wishing to be bound by theory, it may be helpful to briefly outline some theoretical considerations relevant to spatial low pass filtering.

Mask Size and Touch Position

When a user touches a touchscreen panel, for example a projected capacitance touchscreen panel 20, 21, 22, the digit 33 or stylus contacting the panel will not exclusively couple to a single electrode. Instead, the touch event will include signals from whichever intersection $I_{n,m}$ is closest to the touch point and also from adjacent or nearby intersections, for example $I_{n+1,m}$, $I_{n,m+1}$ etc. In this way, the touch event has an interaction area 59 (FIG. 16A) which encompasses multiple intersections $I_{n,m}$ of the drive and sense electrodes $D_n$, $S_m$. An interaction area 59 spanning multiple intersections $I_{n,m}$ is not limited to projected capacitance touchscreen panel 20, 21, 22 types, and other types of touchscreen panel such as, for example, pressure sensing touchscreen panels, may have interaction areas 59 which encompass several intersections $I_{n,m}$.

If the linear filter mask 58 dimensions L, W are larger than the interaction area 59, then a spatial low pass filter 13 may reduce the relative strength of the touch signal, which may result in failure to register a touch event. Additionally, in order to avoid potential interference between two concurrent touch events, which may cause a skew in the registered position of a touch event, the linear filter mask 58 dimensions L, W should preferably be no larger than the typical interaction area 59 of a touch event. The dimensions L, W of the mask may be determined based on the typical size of a human digit 33 and the dimension l and spacing s of the active areas $A_s$ of sensor areas/intersections $I_{n,m}$. For example, in the experimental projected capacitance touchscreen panel the active area $A_s$ of intersections $I_{n,m}$ was 3 mm by 3 mm, spaced apart by s=2 mm, so the interaction area 59 for a typical human digit 33 is approximately 3 by 3 intersections $I_{n,m}$. It may be helpful to analyse the relationship between the linear filter mask 58 dimensions L, W for a spatial low pass filter 13 and touch event registration.

Figures 16A, 16B:
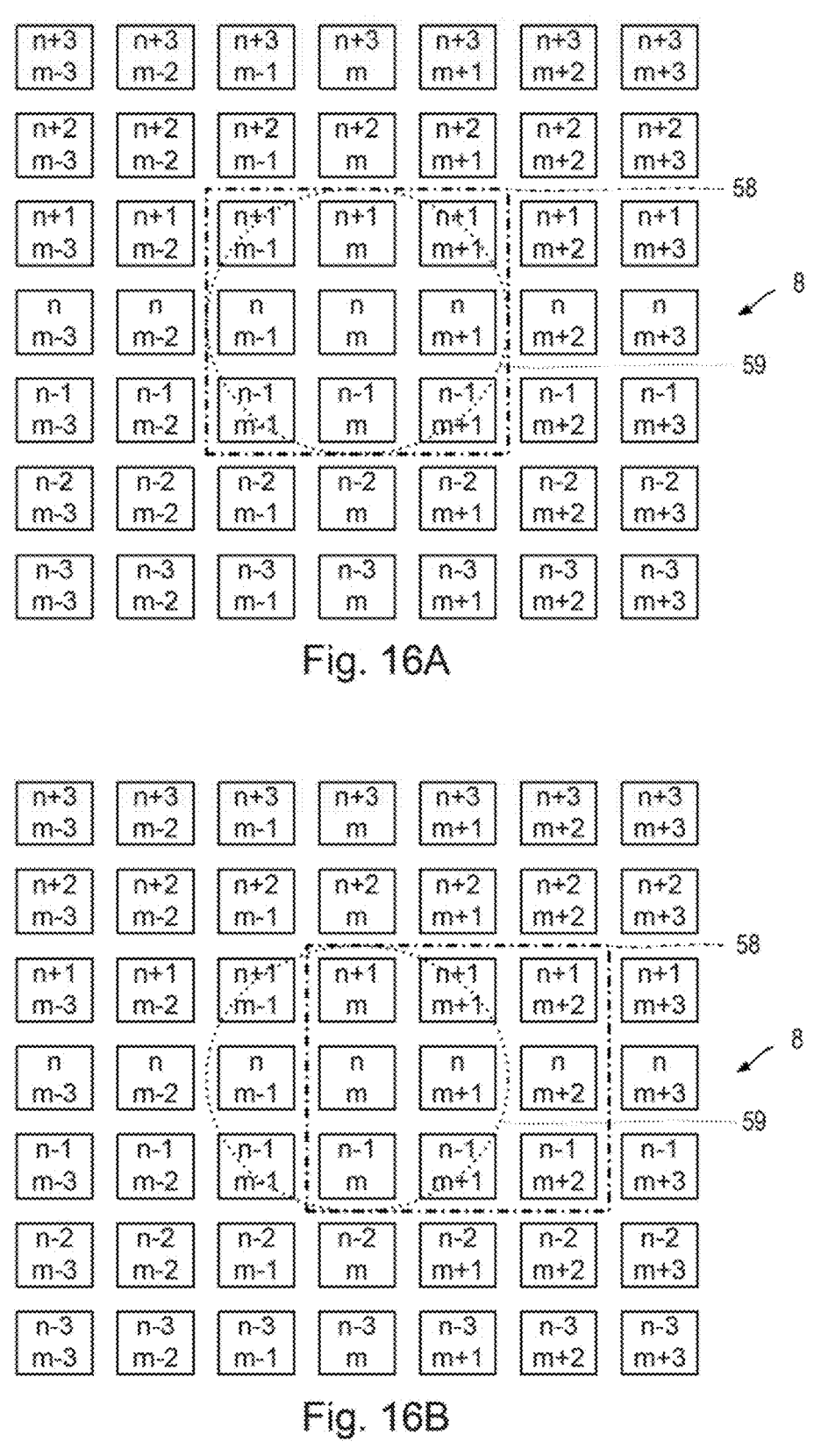

FIGS. 16A and 16B illustrate a grid 8 of corrected frame values $F_{CDS}(n,m,k)$ with interaction areas 59 superimposed.

Referring to FIG. 4 and FIG. 16A, a touch event centred on $I_{n,m}$ has an interaction area 59 which approximately encompasses a 3 by 3 block of intersections $I_{n,m}$, i.e. n±1, m±1. A linear filter mask 58 used for a spatial low pass filter 13 may have dimensions L=3 by W=3, so that the interaction area 59 approximately coincides with the linear filter mask 58 when centred on the intersection $I_{n,m}$ closest to a touch event. If an average filter is used, i.e. if $C_{i,j}=1/9$ $\forall 0 \leq i \leq L-1$ and $0 \leq j \leq W-1$, then the filtered frame value $F_{LPSF}(n,m)$ may be expressed as:

$$F_{LPSF}(n, m) = \frac{1}{9} \sum_{i=n-1}^{n+1} \sum_{j=m-1}^{m+1} F_{CDS}(i, j)$$

in which i and j are indices for the summation. For simplicity of analysis, if signal frame values at equal distances from the central corrected frame value $F_{CDS}(n,m,k)$ are taken to be equal, for example so that $F_{CDS}(n+1,m,k)=F_{CDS}(n,m+1,k)$ etc, then Equation 11 may be simplified to:

$$F_{LPSF}(n, m) \approx \frac{F_{CDS}(n, m, k) + 4F_{CDS}(n+1, m, k) + 4F_{CDS}(n+1, m+1, k)}{9}$$

The signal values at the nearest intersections $F_{CDS}(n+1,m,k)$ and at next nearest intersections $F_{CDS}(n+1,m+1)$ substituted using scaling factors:

$$F_{CDS}(n+1, m, k) = \frac{F_{CDS}(n, m, k)}{\beta}, \beta > 1$$

$$F_{CDS}(n+1, m+1, k) = \frac{F_{CDS}(n, m, k)}{\gamma}, \gamma > 1$$

in which β and γ are scaling factors. Using the scaling factors, β, γ, the filtered signal value $F_{LPSF}(n,m,k)$ may be approximated as:

$$F_{LPSF}(n, m, k) \approx \frac{F_{CDS}(n, m, k) + \frac{4F_{CDS}(n, m, k)}{\beta} + \frac{4F_{CDS}(n, m, k)}{\gamma}}{9}$$

$$F_{LPSF}(n, m, k) \approx \frac{F_{CDS}(n, m, k)(\beta\gamma + 4\beta + 4\gamma)}{9bc}$$

The sensitivity of the filtered frame value $F_{LPSF}(n,m,k)$ to positional mis-registrations caused by noise spikes 38 may be evaluated by considering the conditions under which the filtered frame value of one of the nearest neighbour locations to the touch event, for example $F_{LPSF}(n,m+1)$, exceeds the filtered frame value $F_{LPSF}(n,m)$ at the touch event location.

Referring also to FIG. 16B, when the linear filter mask 58 is applied to a nearest neighbour intersection $I_{n,m+1}$, the filtered frame value of a nearest neighbour location $F_{LPSF}(n,m+1)$ may be expressed as:

$$F_{LPSF}(n, m, k) = \frac{1}{9} \sum_{i=n-1}^{n+1} \sum_{j=m}^{m+2} F_{CDS}(i, j, k)$$

$$F_{LPSF}(n, m, k) \approx \frac{F_{CDS}(n, m, k) + 3F_{CDS}(n+1, m, k) + 2F_{CDS}(n+2, m, k) + \sum_{i=n-1}^{n+1} F_{CDS}(i, m+2, k)}{9}$$

in which i and j are indices for summation and in which the previous simplifying assumption of equivalence amongst nearest neighbours and next nearest neighbours have been made, e.g. $F_{CDS}(n+1,m,k)=F_{CDS}(n,m+1,k)$ etc. Corrected frame values $F_{CDS}(n,m,k)$ for intersections which are outside of the interaction area 59 may be taken to have a value which is dominated by noise, for example $F(n,m+2,k)=F(n+1,m+2,k)=H$, in which H is a randomly distributed variable representing the noise signal 4. Substituting the scaling factors from Equation 13, the filtered frame value of a nearest neighbour location $F_{LPSF}(n,m+1,k)$ may be approximated as:

$$F_{LPSF}(n, m, k) = \frac{F_{CDS}(n, m, k)(\beta\gamma + 3\gamma + 2\beta) + 3\beta\gamma H}{9}$$

in which β and γ are scaling factors and H is a randomly distributed variable representing the noise 4.

In order to ensure that mis-registration of the touch position after spatial low pass filtering is avoided, i.e $F_{LPSF}(n,m,k) > F_{LPSF}(n,m+1,k)$, the inequality:

$$\frac{F_{CDS}(n, m, k)}{H} > \frac{3\beta\gamma}{3\beta + \gamma}$$

should be satisfied. The ratio $F_{CDS}(n,m,k)/H$ is related to the SNR. In a typical projected capacitance touchscreen panel 20, 21, 22, H is approximately two orders smaller than F(n,m), and the scaling parameters β, γ typically lie in a range between one and three. In this way, the condition of Equation 17 is typically satisfied for a projected capacitance touchscreen panel 20, 21, 22 when a linear filter mask 58 for a spatial low pass filter 13 has dimensions L=3 by W=3. However, when the mask 48 dimensions increase to L=5 by W=5, the condition of Equation (17) may become dominated by the noise values H, resulting in increased probability mis-registering the location of a touch event. The inequality in is not specific to projected capacitance touchscreen panels 20, 21, 22, and may equally apply to any touchscreen panel 6 which has an interaction area 59 for a touch event which encompasses more than one intersection $I_{n,m}$.

The dimensions of the linear filter mask 58 suitable for a given touchscreen panel 6 need not be L=3 by W=3, and in general will depend on the physical characteristics of the touchscreen panel such, for example, the sensor area $I_{n,m}$ dimension l and spacing s, and on the SNR for the touchscreen panel 6. An analysis similar to Equation 17 may indicate that linear filter masks 58 with dimensions larger than L=3 by W=3 are appropriate for some examples of projected capacitance touchscreen panels 20, 21, 22, for example when the grid 8 resolution is very fine. Equally, touchscreen panels 6 which use other mechanisms to detect touch events, for example pressure sensing touchscreen panels, may use linear filter masks 58 which have larger dimensions than L=3 by W=3, depending upon the physical characteristics of the touchscreen panel such, for example, the sensor area $I_{n,m}$ dimension l and spacing s, and on the SNR for the touchscreen panel 6.

Spatial Frequency Properties of Signal and Noise Spikes

Signals corresponding to touch events are typically of relatively low spatial frequency compared to noise spikes, when the touch event is generated by user's digit 33. However, some types of touch events, for example touch events generated by user input via a suitable stylus, may have relatively higher spatial frequency compared to a touch event generated by user input with a digit 33. For example, a touch event generated by a stylus may have an interaction area 59 which encompasses a single intersection $I_{n,m}$.

Although noise spikes are typically considered to have high spatial frequency, for example to effect a single intersection $I_{n,m}$, it is also possible for noise spikes to have spatial frequencies which are lower than a single intersection $I_{n,m}$.

When the spatial frequencies of touch signals and noise spikes are close or overlap, it is difficult to apply a spatial low pass filter 13 to maximise the attenuation of noise spikes 38 without also attenuating the desired touch signal. Applying a single linear filter mask 58 is likely to be less than optimal for many users, and may be inappropriate for alternating between user input using a digit 33 and a stylus.

Second Method of Processing Output Signals from a Touchscreen Panel

One way to maximise attenuation of noise spikes 38 without detrimentally attenuating the desired touch signals is to dynamically tune the bandwidth of a spatial low pass filter 13 by dynamically adjusting the coefficients $C_{i,j}$ of a linear filter mask 58 with fixed dimensions L, W.

A second method of processing output signals from a touchscreen panel applies a spatial low pass filter 13 using linear filter masks 58 having varying bandwidth determined by the coefficients $C_{i,j}$ of the linear filter mask 58. A linear Gaussian filter may be represented by an array composed of coefficients $C_{i,j}$ expressed generally as:

$$C_{i,j} = G\exp\left(-\frac{\left(i-\frac{L-1}{2}\right)^2}{\sigma_n^2} - \frac{\left(j-\frac{W-1}{2}\right)^2}{\sigma_m^2}\right)$$

in which G is an amplitude, L and W are the dimensions of the linear filter mask 58, i and j are indices ranging from 0≤i≤L−1 and 0≤j≤W−1 respectively, $\sigma_n$ is a standard deviation in a first direction x and $\sigma_m$ is a standard deviation in a second direction y. The amplitude G is preferably a normalisation factor to minimise an overall increase or decrease in the average intensity of the filtered frame values $F_{LPSF}$(n,m,k) compared to the corrected frame $F_{CDS}$(n,m). In general, a touchscreen panel 6 having a grid 8 of intersections $I_{n,m}$ defined by electrodes $X_n$ (e.g. drive electrodes $D_n$) in a first direction $d_1$ (e.g. x) and electrodes $Y_m$ (e.g. sense electrodes $S_m$) in a second direction $d_2$ (e.g. y) need not be a square grid, and the standard deviations $\sigma_n$, $\sigma_m$ may be different accordingly. When a grid 8 is square, so that intersections $I_{n,m}$ are spaced evenly in first and second directions $d_1$, $d_2$, i.e $s_1$=$s_2$, the standard deviations are also equal, i.e. $\sigma_n$=$\sigma_m$=$\sigma$. For example, when a linear filter mask 58 has dimensions L=3 by W=3, the coefficients may be expressed as:

$$C_{i,j} = G\exp\left(-\frac{(i-1)^2 + (j-1)^2}{\sigma^2}\right)$$

in which 0≤i≤2 and 0≤j≤2.

FIGS. 17A to 17D show projected 3D surface plots of the values of coefficients $C_{i,j}$ for the linear filter mask 58 of a Gaussian filter for standard deviation values of σ=0.5, σ=1, σ=2 and σ=4 respectively.

Referring to FIGS. 17A to 17D, a small value of standard deviation a indicates relatively weak coupling between an intersection $I_{n,m}$ and the other intersections encompassed by the linear filter mask 58, for example $I_{n+1,m}$. A small value of standard deviation a therefore indicates relatively weaker attenuation of a noise spike 38 corresponding to a single intersection $I_{n,m}$. In contrast, a larger value of standard deviation a indicates stronger coupling between an intersection $I_{n,m}$ and the other intersections encompassed by the linear filter mask 58, for example $I_{n+1,m}$. A larger value of standard deviation a therefore indicates relatively stronger attenuation of a noise spike 38 corresponding to a single intersection $I_{n,m}$. In this way, the bandwidth of a spatial low pass filter 13 may be readily adjusted according to the value of the standard deviation a used to calculate the coefficients $C_{i,j}$ for the a Gaussian linear filter mask 48.

Figure 18:
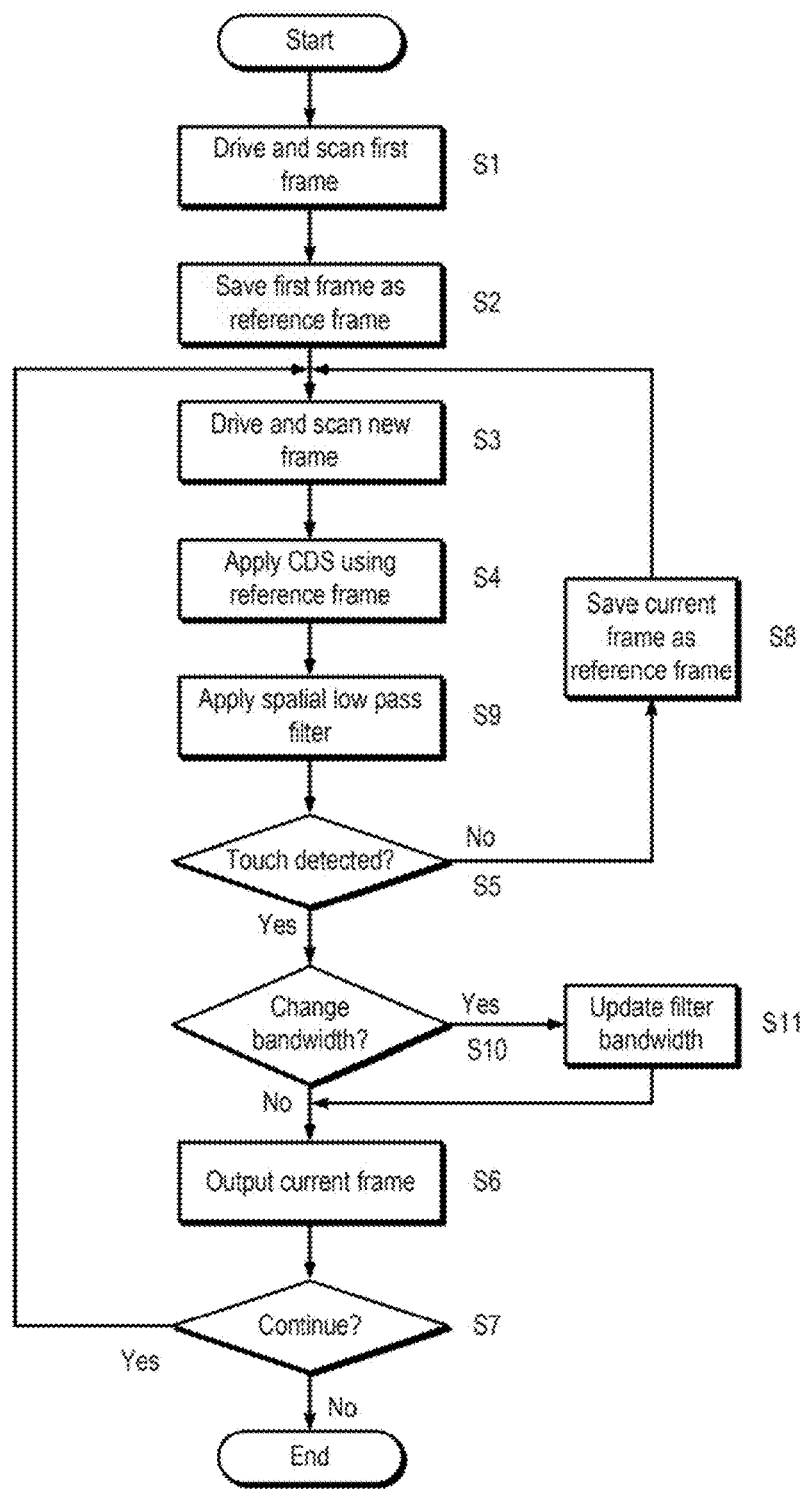
FIG. 18 shows a process flow diagram for a second method of processing output signals from a touchscreen panel.

FIG. 18 shows a process flow diagram for a second method of processing output signals from a touchscreen panel.

Referring to FIGS. 4 to 5C, FIG. 9 and FIG. 18, in the same way as for the first method, a first frame F(n,m,1) is read out by the frame reading module 9 upon start-up of the touchscreen system 5, (step S1) and a background pattern or reference frame $F_0$(n,m) is initially set equal to the first frame F(m,n,1) and stored to the reference frame store 11 (step S2).

In the same way as for the first method, during operation of the touchscreen system 5, the frame reading module 9 reads out signal frames F(n,m,k) at the scan frequency $f_s$ (step S3), and the correlated double sampler receives and corrects the signal frames F(n,m,k) by subtracting the reference frame $F_0$(n,m) to generate corresponding corrected frames $F_{CDS}$(n,m,k) (step S4 and Equation 1).

The spatial low pass filter 13 receives the corrected frame $F_{CDS}$(n,m,k) and filters it using a linear filter mask 58 to produce a filtered frame $F_{LPSF}$(n,m,k) (step S9). The initial bandwidth of the spatial low pass filter 13 may be set to a predetermined value. Alternatively the initial bandwidth may be set to the finishing value of bandwidth from a previous occasion that the touchscreen system 5 was operating. For example, the spatial low pass filter 13 may be a Gaussian filter characterised by a linear filter mask 58 in the form of an array of coefficients $C_{i,j}$ calculated according to Equation (18) with a standard deviation a. The standard deviation a may be set initially set to a predetermined value $\sigma_0$. Alternatively, the standard deviation a may be set to the finishing value of standard deviation a from a previous occasion that the touchscreen system 5 was operating.

The touch decision module analyses the filtered frame $F_{LPSF}$(n,m,k) to determine whether a touch event, for example a single-touch event or a multi-touch event is occurring (step S5). If a touch event is not occurring (step S5; No), the reference frame $F_0(n,m)$ is updated by overwriting the reference frame $F_0(n,m)$ equal stored in the reference frame store 11 with the current signal frame $F(n,m,k)$ (step S8), and the next signal frame $F(n,m,k+1)$ is read out by the frame reading module 7 (step S3).

If a touch event is occurring (step S5; Yes), the bandwidth decision module 15 decides whether the bandwidth of the spatial low pass filter 13 is optimal or whether the bandwidth of the spatial low pass filter 13 should be changed (step S10). The bandwidth decision module 15 may evaluate the attenuation of the touch signals and the noise spikes 38 by comparing the CDS corrected frame $F_{CDS}(n,m,i)$ to the filtered frame $F_{LPSF}(n,m,i)$. After touch events have been identified (see step S5), any values of the corrected or filtered frames $F_{CDS}(n,m,k)$, $F_{LPSF}(n,m,k)$ corresponding to intersections $I_{n,m}$ determined to be part of a touch event by the touch decision module 12 are signal values, and any other non-zero values may be regarded as noise. A variety of criteria for adjusting the bandwidth of the spatial low pass filter 13 may be applied by the bandwidth decision module 15. For example, when the filter uses a Gaussian filter mask 58 with coefficients $C_{i,j}$ calculated according to Equation (18) with a standard deviation σ, the bandwidth decision module 15 may increase or decrease the standard deviation σ value to maintain the SNR at a threshold value. Alternatively, the processor or touch controller may increase or decrease the standard deviation σ value to try and maximise the attenuation of noise spikes 38 whilst keeping the attenuation of touch signals above a threshold value.

Alternatively, the bandwidth decision module 15 need not adjust the bandwidth incrementally, and may use predetermined signal/noise attenuation models received from the signal/noise attenuation model stores 16, 17. The bandwidth decision module 15 may select an optimal bandwidth for the spatial low pass filter 13 based on the characteristics of the noise 4 present in the frame. An example of measuring a model relating noise spike and signal attenuation to the spatial low pass filter 13 bandwidth is explained hereinafter. For example, when the filter is a Gaussian filter mask 58 having coefficients $C_{i,j}$ calculated according to Equation (18) with a standard deviation a, the bandwidth decision module 15 may select a value of the standard deviation a based on predetermined signal/noise attenuation models relating noise spike and signal attenuation to the value of standard deviation σ.

The bandwidth decision module 15 may use a combination of modelling and incremental alterations, for example, the processor or touch controller may employ machine learning methods or "fuzzy" methods to explore parameters close to a modelled value in order to improve the signal/noise attenuation models stored in the signal/noise attenuation model stores 16, 17 by adding additional data points.

If the bandwidth decision module 15 determines that bandwidth of the spatial low pass filter 13 does needs adjusting (step S10; Yes), the bandwidth decision module 15 adjusts the bandwidth by overwriting the coefficients $C_{i,j}$ stored in the mask store 14 with updated coefficients $C_{i,j}$ (step S11). The touch decision module 12 determines and outputs the touch information 18 to the device CPU 19 (step S6). Whilst the touchscreen system 5 is operating (step S7), the next signal frame $F(n,m,k+1)$ is read out by the frame reading module 9 (step S3).

If the bandwidth of the spatial low pass filter does not need adjusting (step S10; No), the touch decision module 12 determines and outputs the touch information 18 to the device CPU 19 (step S6).

All the steps occurring between reading out a signal frame $F(n,m,k)$ and reading out a subsequent signal frame $F(n,m,k+1)$ (steps S4 to S11) are preferably conducted in less time than the scanning interval $1/f_s$. For example, if frames are read out during display quiet/blanking periods, then the steps occurring between reading out a signal frame $F(n,m,k)$ and reading out a subsequent signal frame $F(n,m,i+k)$ (steps S4 to S11) preferably do not take longer than the interval between display quiet/blanking periods.

In this way, noise spikes 38 which are not removed by the correlated double sampler 10, for example because they are uncorrelated to the reference frame $F_0(n,m)$, may be attenuated by the spatial low pass filter 13. This may further increase the SNR for outputs from a touchscreen panel 6, and enable the signal thresholds and/or excitation power to be further reduced compared to CDS corrections alone. The second method of processing output signals from a touchscreen panel uses a spatial low pass filter 13 which is dynamically updated. This may allow the signal processing to remain optimised when different users having different sized digits 33 use the touchscreen system 5 or when a user switches between using a digit 33 and using a stylus.

Example of Using the Second Method

The use of the second method of processing output signals from a touchscreen panel may be illustrated with reference to experiments conducted using the experimental projected capacitance touchscreen panel described hereinbefore (see Table II). To evaluate the smoothing effect of a spatial low pass filter 13, three factors were considered: SNR, signal attenuation and noise attenuation.

Figure 19:
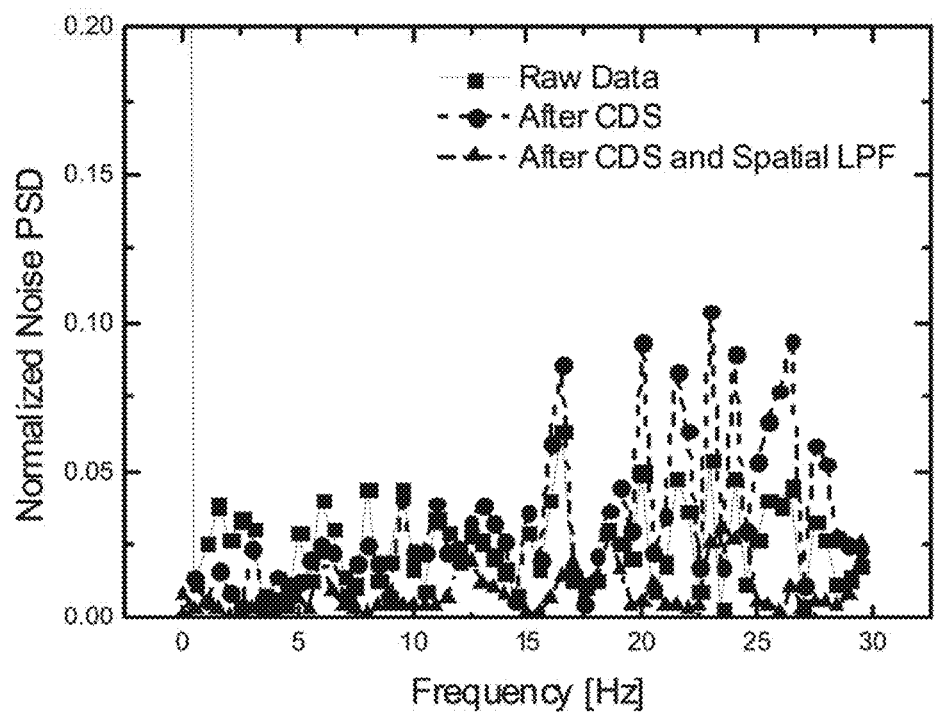
FIG. 19 compares normalized power spectral density plots for raw output signals, correlated double sampled signals and correlated double samples and filtered signals.

FIG. 19 shows normalized power spectral density (PSD) plots for the raw signal frames $F(n,m,k)$, the frames after CDS correction $F_{CDS}(n,m,k)$ and the frames after CDS correction and spatial low pass filtering $F_{LPSF}(n,m,k)$.

Referring to FIG. 19, the high frequency noise which may be introduced by the CDS correction, as hereinbefore described, may be suppressed by the spatial low pass filtering. In this way, the CDS correction and spatial low pass filtering are complementary, in that the overall improvement in SNR may be superior to that obtained by simply summing the improvements from CDS or spatial low pass filtering applied individually. In the data obtained from the experimental projected capacitance touchscreen panel, the SNR was observed to be increased by 15.6 dB, and the signal and noise spike were observed to be attenuated by 4.51 dB and 19.25 dB respectively.

Figure 20A:
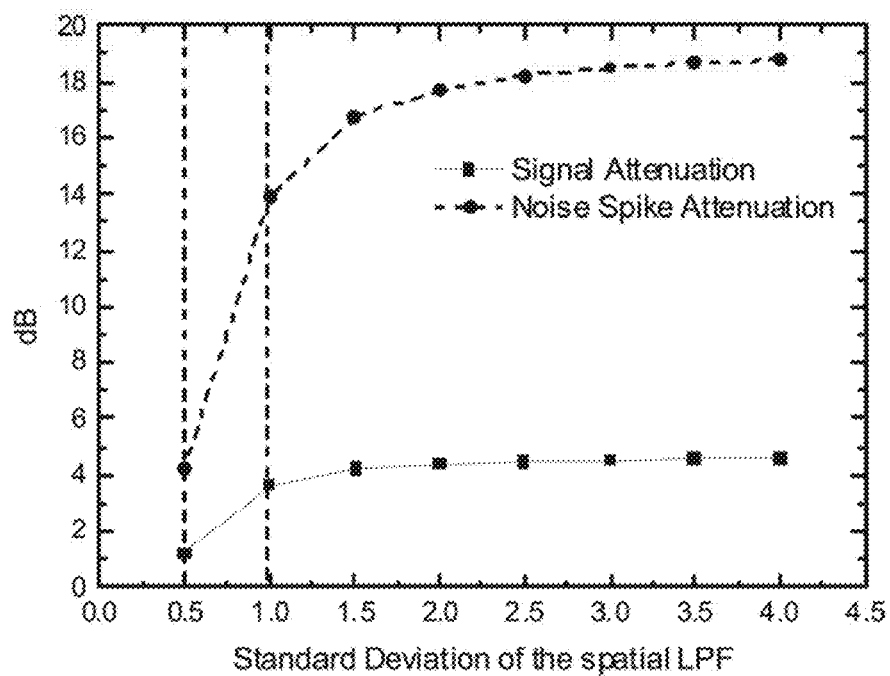
FIGS. 20A and 20B plot noise spike attenuation and touch signal attenuation plotted against the standard deviation of a Gaussian filter mask.
Figure 20B:
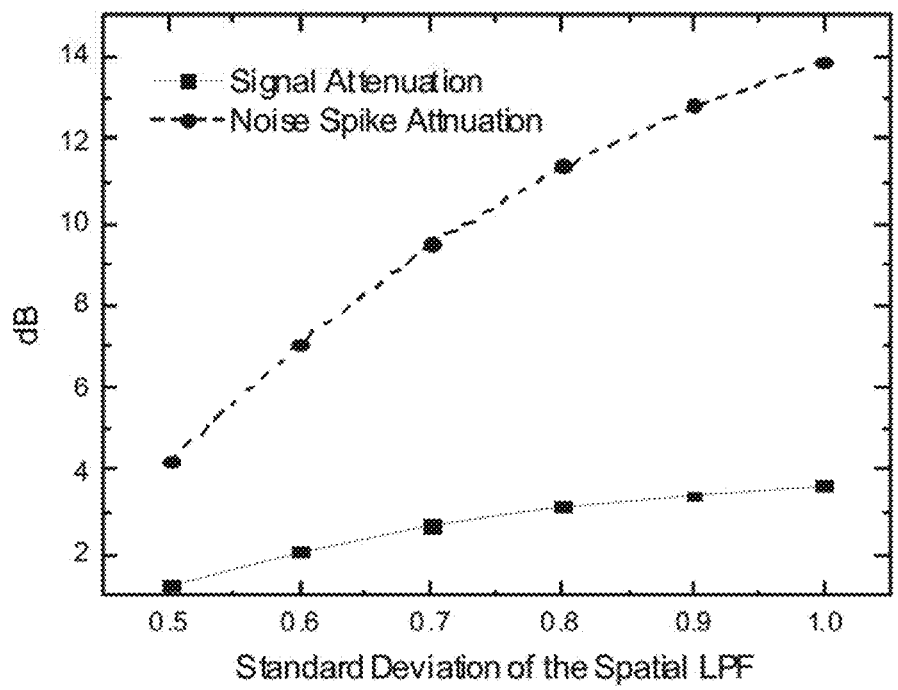

FIG. 20A shows plots of the noise spike attenuation and the touch signal attenuation plotted against the standard deviation a of a Gaussian filter mask 58. The plots were obtained from simulations based on the data from the experimental projected capacitance touchscreen panel. FIG. 20B shows the range of standard deviations between σ=0.5 and σ=1.

Referring to FIGS. 20A and 20B, it is observed that because of the relatively higher spatial frequency of the noise spikes 38 compared to the touch signals, the noise spikes display relatively higher attenuation compared to the touch signal following spatial low pas filtering. The attenuation of noise spikes 38 and touch signals for the experimental projected capacitance touchscreen panel both display rapid increases with standard deviation a within the range of σ=0.5 to σ=1. For larger values of standard deviation σ>1.5, the attenuation appears to saturate. The observed relationships are specific to the experimental projected capacitance touchscreen panel, however, the same analysis may readily be applied to any other projected capacitance touchscreen panels 20, 21, 22 or to touchscreen panels 6 which measure different physical parameters such as, for example, pressure.

Measured relationships between the attenuation of touch signals and noise spikes 38 may be used in to produce signal/noise attenuation models 16, 17 for use in the second method of processing signals from a touchscreen panel, as described hereinbefore. For example, because the attenuation of the noise spikes 38 is observed to increase more rapidly with standard deviation a than the signal attenuation, the observed relationships may be used as models to determine a value of standard deviation σ which preserves the SNR above a threshold value if the amplitude of noise spikes increases. Alternatively, the measured relationships may be used as models to select an initial value for the standard deviation $\sigma_0$ when the touchscreen system 5 starts up. For example, if an accepted signal attenuation is 2 dB, then the initial Gaussian distribution based mask with standard deviation at 0.6 would be used to maximally attenuate noise spikes without attenuating the touch signals by an unacceptable amount.

Time and Energy Budget of the Second Method of Processing Signals from a Touch Screen Panel Compared to the first method of processing, the complexity of the second method of processing is increased to around O(3N). Similar calculations to those performed for the first method indicate that a typical commercially available processor for a mobile device would require approximately 19.2 µs and the power consumption of the algorithm would be 21.6 nW. Thus, the computational time of the second method is substantially less than the interval between frame readouts for a typical scanning rate of 60 Hz, and the power consumption of the algorithm is negligible compared to the power consumption of reading out a frame. In this way, the second method may be used to improve SNR and remove offsets 3 without comprising the scan frequency $f_s$ or power consumption of a touchscreen system 5.

It will be appreciated that many modifications may be made to the embodiments hereinbefore described. Such modifications may involve equivalent and other features which are already known in the design, manufacture and use of touch panels and which may be used instead of or in addition to features already described herein. Features of one embodiment may be replaced or supplemented by features of another embodiment.

For example, a second method of processing signals from a touchscreen panel is described which combines CDS corrections with spatial low pass filtering. However, spatial low pass filtering may be applied directly to the signal frames F(n,m,k) read out by the frame reading module 9 to provide a modest improvement in SNR by smoothing of high frequency components of the noise 4.

Transparent touchscreen panels 6 of a touchscreen system 5 have been described. However, the first and second methods are not limited to transparent touchscreen panels 6 overlying or integrated into a display screen. For example, the first and second methods may also be applied to a touch panel, for example an opaque touch panel for providing input to a data processing device such as a laptop computer.

A second method of processing signals has been described in which the bandwidth of a spatial low pass filter 13 is adjusted by a bandwidth decision module. However, the bandwidth need not be variable, and in some alternative methods the CDS correction according to the first method may be combined with spatial low pass filtering using a spatial low pass filter 13 having fixed bandwidth.

It has been described that the most recent signal frame F(n,m,k) which does not include a touch event is stored as the reference frame $F_0(n,m)$. However, this may result in an unexpected 'bad frame', for example resulting from a temporary hardware malfunction to be stored as the reference frame, possibly leading to a deterioration of SNR in subsequent frames. Other methods of updating the reference frame $F_0(n,m)$ may be used which are able to improve the robustness of the reference frame $F_0(n,m)$ updating. For example, by applying exponential smoothing so that the reference frame is assigned as:

$$F_0(n,m) \rightarrow \delta \times F(n,m) + (1-\delta) F(n,m,k)$$

in which δ is a weighting factor.

The weighting factor δ can be adjusted to optimize performance. However, using exponential smoothing may weaken the correlation between adjacent frames. The trade-off between cancelling noise and robustness may depend on the application and the physical characteristics of the touchscreen panel 6.

The efficiency of applying a linear filter mask 58 to frame values, F(n,m,k), $F_{CDS}(n,m,k)$ may be improved by not performing the summation in Equation 2 directly. For example, for an average filter, an intermediate frame may be constructed in which each pixel contains the sum of 3 pixels in the first direction $d_1$, x, for example $F_{CDS}(n,m,k)+F_{CDS}(n+1,m,k)+F_{CDS}(n+2,m,k)$. The final filtered image $F_{LPSF}(n,m,k)$ may be obtained by performing the same process on the intermediate image in the second direction $d_2$, y, and then dividing by a scaling constant. This process is equally valid for Gaussian-weighted filters. This may be especially useful for touchscreen panels 6 having a higher grid 8 resolution, i.e. reduced spacing s, which may require linear filter masks 58 with dimensions larger than L=3 by W=3, because using an intermediate frame the computational complexity scales linearly with the linear filter mask 58 dimensions L, W instead than quadratically.

Gaussian spatial low pass filters 13 have been described. Alternatively, any spatial low pass filters having a peak and a parameter for adjusting the relative width of the peak may be used instead of a Gaussian filter.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

The invention claimed is:

1. A method comprising:
    receiving a first array of values obtained from measuring an array of touch panel sensor areas;
    generating a second array of values based on subtracting a reference array of values from the first array of values, wherein generating the second array comprises:
        generating a third array by subtracting the reference array from the first array; and generating the second array by filtering the third array using a spatial low pass filter having a bandwidth equal to a reference bandwidth value;
determining presence of at least one touch event in dependence upon the second array of values; and
upon a negative determination:
generating a new reference array based on exponential smoothing of the reference array and the first array using a weighting factor, or generating a new reference array which is equal to the first array; and,
storing the new reference array; and
upon a positive determination:
outputting the second array
determining, based on a difference of the second array and the third array, a first amount by which values corresponding to at least one touch event are attenuated and a second amount by which values not corresponding to any touch event are attenuated;
generating a new reference bandwidth value based on the first amount and the second amount; and
storing the new reference bandwidth value.

2. A method according to claim 1, wherein determining a new reference bandwidth value comprises:
comparing the first amount to a predetermined threshold; and
in dependence upon the first amount exceeding the threshold, generating the new reference bandwidth value by subtracting a bandwidth increment from the reference bandwidth value.

3. A method of processing signals from a touchscreen panel according to claim 2, wherein determining a new reference bandwidth value comprises:
determining, based on a first model relating the first amount to the bandwidth value and a second model relating the second amount to the bandwidth value, an optimal bandwidth value such that the second amount is maximised without the first amount exceeding a predetermined threshold; and
generating the new reference bandwidth based on the optimal bandwidth.

4. A method according to claim 1, wherein the spatial low pass filter is a linear filter.

5. A method according to claim 1, wherein the spatial low pass filter is based on a function comprising a peak, the peak having a relative width determined by the reference bandwidth value.

6. A method according to claim 1, wherein the spatial low pass filter is a Gaussian filter and a reference bandwidth value for the spatial low pass filter is a standard deviation of the Gaussian filter.

7. A method according to claim 1, wherein generating the second array by filtering the third array using a spatial low pass filter comprises:
generating a fourth array, each entry of the fourth array calculated by summing at least three adjacent row entries of the third array including the corresponding entry of the third array; and
generating the third matrix, each entry of the third array calculated by summing at least three adjacent column entries of the fourth array including the corresponding entry of the fourth array, and dividing by a respective scaling factor.

8. A method according to claim 1, wherein the spatial low pass filter is a non-linear filter.

9. A method according to claim 1, wherein each first array value is based on the capacitance of the respective sensor area.

10. A method according to claim 1, wherein each first array value is based on the force applied to the respective sensor area.

11. A method according to claim 1, wherein each entry of the first array is a sub-array having a first value based on the capacitance of the respective sensor area and a second value based on the force applied to the respective sensor area, wherein operations performed on the first array are performed entry-wise on each sub-array.

12. A computer program product stored on a non-transitory computer readable medium which, when executed by a data processing unit, causes the data processing unit to:
receive a first array of values obtained from measuring an array of touch panel sensor areas;
generate a second array of values based on subtracting a reference array of values from the first array of values, wherein generating the second array comprises:
generating a third array by subtracting the reference array from the first array; and
generating the second array by filtering the third array using a spatial low pass filter having a bandwidth equal to a reference bandwidth value;
determine presence of at least one touch event in dependence upon the second array of values; and
upon a negative determination:
generate a new reference array based on exponential smoothing of the reference array and the first array using a weighting factor or generate a new reference array which is equal to the first array; and
store the new reference array; and
upon a positive determination:
output the second array;
determine, based on a difference of the second array and the third array, a first amount by which values corresponding to at least one touch event are attenuated and a second amount by which values not corresponding to any touch event are attenuated;
generate a new reference bandwidth value based on the first amount and the second amount; and
store the new reference bandwidth value.

13. An apparatus comprising:
a frame reading module configured to receive a first array of values obtained from measuring an array of touch panel sensor areas;
a correlated double sampler configured to generate a second array of values based on subtracting a reference array of values from the first array of values, wherein generating the second array comprises:
generating a third array by subtracting the reference array from the first array; and,
generating the second array by filtering the third array using a spatial low pass filter having a bandwidth equal to a reference bandwidth value;
a touch decision module configured to determine presence of at least one touch event in dependence upon the second array of values; and
upon a negative determination:
generate a new reference array based on exponential smoothing of the reference array and the first array using a weighting factor, or generate a new reference array which is equal to the first array; and
store the new reference matrix; and
upon a positive determination:
output the second array; and, a bandwidth decision module configured, in response to a positive determination of the presence of at least one touch event, to:
- determine, based on a difference of the second array and the third array, a first amount by which values corresponding to at least one touch event are attenuated and a second amount by which values not corresponding to any touch event are attenuated;
- generate a new reference bandwidth value based on the first amount and the second amount; and
- store the new reference bandwidth value.

14. The apparatus according to claim 13, wherein each first array value is based on the capacitance of the respective sensor area.

15. The apparatus according to claim 13, wherein each first array value is based on the force applied to the respective sensor area.

16. The apparatus according to claim 13, wherein each entry of the first array is a sub-array having a first value based on the capacitance of the respective sensor area and a second value based on the force applied to the respective sensor area, wherein operations performed on the first array are performed entry-wise on each sub-array.

17. The apparatus of claim 13 further comprising:
a touch panel comprising the array of touch panel sensor areas including a plurality of sensor areas disposed in a sensor array, each sensor area configured to provide an output signal which varies in response to a touch event.

* * * * *

UNITED STATES PATENT AND TRADEMARK OFFICE
CERTIFICATE OF CORRECTION

PATENT NO. : 10,061,434 B2
APPLICATION NO. : 15/346696
DATED : August 28, 2018
INVENTOR(S) : Arokia Nathan et al.

Page 1 of 1

It is certified that error appears in the above-identified patent and that said Letters Patent is hereby corrected as shown below:

On the Title Page

After "(65) Prior Publication Data
US 2017/0139527 A1 May 18, 2017" insert:
--(30) Foreign Application Priority Data
November 12, 2015 (GB).......................1519948.2--;

In the Specification

At Column 1, at Line 3, after "PROCESSING SIGNALS FROM A TOUCH SCREEN PANEL" insert the following paragraph:
--CROSS REFERENCE TO RELATED APPLICATIONS
The present application claims the benefit of United Kingdom patent application 1519948.2 filed November 12, 2015.--.

Signed and Sealed this
Twenty-eighth Day of May, 2019

Andrei Iancu
*Director of the United States Patent and Trademark Office*